United States Patent
Han et al.

(10) Patent No.: US 12,461,226 B2
(45) Date of Patent: Nov. 4, 2025

(54) RADAR MEASUREMENT METHOD AND APPARATUS

(71) Applicant: Huawei Technologies Co., Ltd., Guangdong (CN)

(72) Inventors: Xiao Han, Shenzhen (CN); Cailian Deng, Chengdu (CN); Rui Du, Shenzhen (CN); Chenchen Liu, Shenzhen (CN); Jian Yu, Shenzhen (CN); Meihong Zhang, Shenzhen (CN); Li Yan, Chengdu (CN); Yan Long, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 670 days.

(21) Appl. No.: 17/454,101

(22) Filed: Nov. 9, 2021

(65) Prior Publication Data
US 2022/0066018 A1 Mar. 3, 2022

Related U.S. Application Data

(63) Continuation of application No. PCT/CN2020/089282, filed on May 8, 2020.

(30) Foreign Application Priority Data

May 10, 2019 (CN) .......................... 201910390911.2

(51) Int. Cl.
 *G01S 13/76* (2006.01)
 *G01S 7/00* (2006.01)
 *H04W 84/12* (2009.01)

(52) U.S. Cl.
 CPC ............ *G01S 13/765* (2013.01); *G01S 7/006* (2013.01); *H04W 84/12* (2013.01)

(58) Field of Classification Search
 CPC ....... G01S 13/765; G01S 7/006; H04W 84/12
 (Continued)

(56) References Cited

U.S. PATENT DOCUMENTS

| 6,731,236 B1 * | 5/2004 | Hager ................. G01S 13/4454 342/120 |
| 7,002,508 B2 * | 2/2006 | Wolframm .......... G01S 13/9023 342/25 C |

(Continued)

FOREIGN PATENT DOCUMENTS

| CN | 1985476 A | 6/2007 |
| CN | 105940698 A | 9/2016 |

(Continued)

OTHER PUBLICATIONS

EEE P802.11az /D1.0, Feb. 2019, P802.11az /D1.0, Draft Standard for Information technology Telecommunications and information exchange between systems Local and metropolitan area networks Specific requirements, Part 11: Wireless LAN Medium Access Control, (MAC) and Physical Layer (PHY) Specifications, Amendment 3: Enhancements for positioning, 187 pages.

*Primary Examiner* — Nuzhat Pervin
(74) *Attorney, Agent, or Firm* — WOMBLE BOND DICKINSON (US) LLP

(57) ABSTRACT

A radar measurement method and an apparatus are disclosed, which relate to the field of communications technologies, and are used to support radar measurement in a wireless local area network (WLAN). The method includes: An access point (AP) generates a first frame, where the first frame includes radar measurement information. Then the AP sends the first frame to M stations (STAs), to configure the way the M STAs perform radar measurement. This application is applicable to a radar measurement procedure.

15 Claims, 16 Drawing Sheets

(58) Field of Classification Search
USPC ........................................................ 342/125
See application file for complete search history.

(56) References Cited

U.S. PATENT DOCUMENTS

| | | | | | |
|---|---|---|---|---|---|
| 7,095,362 | B2* | 8/2006 | Hoetzel | ................ | G01S 13/931 342/84 |
| 7,336,217 | B2* | 2/2008 | Voelker | .................. | G01S 13/90 342/25 C |
| 7,433,383 | B2* | 10/2008 | Lemberger | ........... | H04W 24/00 375/150 |
| 7,616,149 | B2* | 11/2009 | Powers | .................. | G01S 13/91 342/36 |
| 8,704,703 | B2* | 4/2014 | Sanyal | ................. | G01S 13/003 342/134 |
| 8,817,722 | B2* | 8/2014 | Dwivedi | .......... | H04W 36/0066 370/348 |
| 10,116,360 | B2* | 10/2018 | Seok | ................ | H04W 74/0816 |
| 10,638,325 | B2* | 4/2020 | Garg | .................. | H04W 16/10 |
| 11,234,166 | B2* | 1/2022 | McFarland | ........... | H04W 24/10 |
| 11,703,582 | B2* | 7/2023 | Trainin | ................ | G01S 13/325 342/134 |
| 2004/0066324 | A1* | 4/2004 | Haynes | .................. | G01S 13/88 342/124 |
| 2004/0169600 | A1* | 9/2004 | Haynes | .................. | G01S 7/282 342/124 |
| 2005/0083225 | A1* | 4/2005 | Braubach | ............. | G01S 13/003 342/25 C |
| 2005/0128126 | A1* | 6/2005 | Wolframm | .......... | G01S 13/9023 342/25 C |
| 2006/0164288 | A1* | 7/2006 | Voelker | ............... | G01S 13/9023 342/25 C |
| 2007/0159378 | A1* | 7/2007 | Powers | .................... | G01S 13/91 342/36 |
| 2009/0160939 | A1* | 6/2009 | Fernandez | ............... | H04N 7/18 455/414.1 |
| 2012/0146788 | A1* | 6/2012 | Wilson | .................. | G08B 13/187 340/539.23 |
| 2012/0184222 | A1* | 7/2012 | Seok | .................... | H04W 16/14 455/67.11 |
| 2012/0314663 | A1* | 12/2012 | Dwivedi | ............. | H04W 36/033 370/329 |
| 2015/0063147 | A1* | 3/2015 | Sadek | ....................... | H04J 1/16 370/252 |
| 2017/0205501 | A1* | 7/2017 | Liu | .......................... | G01S 7/414 |
| 2019/0122414 | A1* | 4/2019 | Sagong | ................. | G06T 15/005 |
| 2021/0076367 | A1* | 3/2021 | Bayesteh | ............... | G01S 7/0232 |
| 2021/0152233 | A1* | 5/2021 | Pan | ..................... | H04B 7/06952 |
| 2022/0231985 | A1* | 7/2022 | Rapaport | ............. | H04L 67/306 |
| 2022/0291327 | A1* | 9/2022 | Gulati | ................... | H04W 76/15 |

FOREIGN PATENT DOCUMENTS

| | | | | |
|---|---|---|---|---|
| CN | 106850097 | A | 6/2017 | |
| CN | 108027661 | A | 5/2018 | |
| CN | 108736985 | A | 11/2018 | |
| EP | 1637902 | B1 * | 1/2008 | ............... G01S 7/40 |
| WO | WO-2019240882 | A1 * | 12/2019 | ........... G01S 13/878 |

* cited by examiner

| Element ID | Element length | Element ID extension | Feedback control | Number of range parameter feedbacks (Nr) | Range parameter #1 | ... | Range parameter #Nr |
|---|---|---|---|---|---|---|---|

| Number of velocity parameter feedbacks (Nv) | Velocity parameter #1 | ... | Velocity parameter #Nr | Number of angle parameter feedbacks (Nv) | Angle parameter #1 | ... | Angel parameter #Nr |
|---|---|---|---|---|---|---|---|

FFT result field

FIG. 19

| Range feedback control | Velocity feedback control | Angle feedback control | Reserved |
|---|---|---|---|

Feedback control field

FIG. 20

| Element ID | Element length | Element ID extension | Number of samples (K) | Value of the first sample | ... | Value of the $K^{th}$ sample |
|---|---|---|---|---|---|---|

Before FFT field

FIG. 21

| Element ID | Element length | Element ID extension | Number of transformation points for FFT (P) | FFT result of the first transformation point | ... | FFT result of the $P^{th}$ transformation point |
|---|---|---|---|---|---|---|

FFT info field

FIG. 22

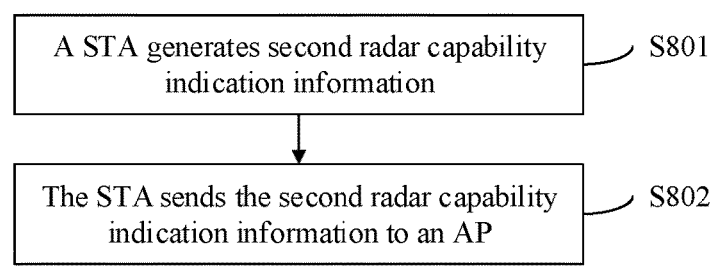

FIG. 23

RADAR MEASUREMENT METHOD AND APPARATUS

CROSS-REFERENCE TO RELATED APPLICATIONS

This is a continuation of International Application No. PCT/CN2020/089282, filed on May 8, 2020, which claims priority to Chinese Patent Application No. 201910390911.2, filed on May 10, 2019. The disclosures of the aforementioned applications are hereby incorporated by reference in their entireties.

TECHNICAL FIELD

This application relates to the field of communications technologies, and in particular, to a radar measurement method and an apparatus.

BACKGROUND

An 802.11az standard of a wireless local area network (WLAN) defines a fine timing measurement (FTM) technology. The FTM technology ranges or positions a target object based on a time of flight of a signal. As shown in FIG. 1, the FTM technology includes the following operations: After an initiator station (ISTA) and a responder station (RSTA) complete an FTM negotiation process, the RSTA sends a trigger frame ranging sounding (TF ranging sounding) to the ISTA. The ISTA returns an uplink null data packet (UL NDP) frame to the RSTA, and records a timestamp t1 at which the UL NDP frame is sent. After the RSTA receives the UL NDP frame, the RSTA records a timestamp t2 at which the UL NDP frame is received. Then, the RSTA returns a downlink ranging null data packet (DL Ranging NDP) frame to the ISTA, and the RSTA later sends a downlink null data packet (DL NDP) frame to the ISTA at a timestamp t3. After the ISTA receives the DL NDP frame, the ISTA records a timestamp t4 at which the DL NDP frame is received. In this way, round trip time (RTT) may be calculated, RTT=[(t4−t1)−(t3−t2)], and the RSTA may be positioned based on the RTT.

However, the FTM technology is applicable only to active objects, but not to passive objects. To measure a passive object, in future scenarios, the industry is ready to introduce a radar technology into the WLAN.

SUMMARY

This application provides a radar measurement method and an apparatus, to support radar measurement in a WLAN.

According to a first aspect, a radar measurement method is provided. The method includes: An access point (AP) generates a first frame, where the first frame includes radar measurement information; and the AP sends the first frame to M stations (STAs), where M is a positive integer. Based on the technical solution, the AP configures the radar measurement information for the M STAs by using the first frame, so that the M STAs can perform corresponding radar measurement based on the radar measurement information. In this way, a radar technology is introduced into the.

In an embodiment, the first frame is used to instruct the M STAs to be ready for radar measurement. In this way, in a polling-based manner, the AP coordinates a plurality of STAs to perform radar measurement. This reduces a collision between radar measurement processes of the plurality of STAs.

In an embodiment, the first frame is used to instruct each STA in the M STAs to perform radar measurement. In this way, in a scheduling-based manner, the AP enables a plurality of STAs to simultaneously perform radar measurement processes, thereby improving accuracy of radar measurement. Radar signals sent by a plurality of STAs are orthogonal, thereby reducing mutual interference between the radar signals sent by the plurality of STAs.

In an embodiment, the first frame is used to instruct a STA that obtains a channel through contention in the M STAs to perform radar measurement. In this way, in a contention-based manner, the AP coordinates a plurality of STAs to perform radar measurement. This reduces a collision between radar measurement processes of the plurality of STAs.

In an embodiment, if the first frame is used to instruct the M STAs to be ready for radar measurement, the method further includes: The AP sends a first poll frame to a target STA, where the target STA is any STA in the M STAs, and the first poll frame is used to trigger the target STA to perform radar measurement.

In an embodiment, the radar measurement information includes at least one of the following parameters: a radar measurement start time point, a measurement periodicity, radar measurement duration, a measurement frequency band, radar measurement resource allocation information, a data feedback information indication, and a radar data feedback type.

In an embodiment, the method further includes: The AP sends a second frame to a STA, where the second frame is used to reserve a transmission opportunity for radar measurement; and the AP receives a third frame sent by the STA, where the third frame is used to respond to the second frame. In this way, that the STA is interfered by another AP in a radar measurement process and proper execution of radar measurement is affected is prevented.

In an embodiment, the method further includes: The AP sends a fourth frame to N STAs, where the fourth frame is used to request each STA in the N STAs to feed back radar measurement data, the N STAs belong to the M STAs, and N is a positive integer; and the AP receives a sixth frame separately sent by one or more STAs in the N STAs, where the sixth frame includes the radar measurement data. In this way, the AP triggers, by using the fourth frame, a plurality of STAs to feed back radar measurement data, so that the plurality of STAs can sequentially feed back the radar measurement data to the AP.

In an embodiment, the method further includes: The AP sends a fifth frame to the N STAs, where the fifth frame is used to instruct each STA in the N STAs to be ready for feeding back radar measurement data; the AP sends a second poll frame to a target STA, where the second poll frame is used to trigger the target STA to feed back radar measurement data; and the AP receives a sixth frame sent by the target STA, where the sixth frame includes the radar measurement data. In this way, a plurality of STAs can sequentially feed back radar measurement data to the AP.

In an embodiment, the method further includes: The AP sends a third poll frame to a target STA, where the third poll frame is used to trigger the target STA to feed back radar measurement data; and the AP receives a sixth frame sent by the target STA, where the sixth frame includes the radar measurement data. In this way, the AP separately sends the third poll frame to different STAs, so that the STAs that receive the third poll frame feed back radar measurement data. In this way, a plurality of STAs can sequentially report radar measurement data to the AP.

In an embodiment, the radar measurement data includes at least one of the following parameters: a sequence ID, a timestamp, a sampling frequency, sampled data of a time domain signal, a fast Fourier transformation spectrum, a radar measurement result, and channel state information, where the radar measurement result includes at least one of the following parameters: a range, a velocity, and an angle.

In an embodiment, the method further includes: The AP sends first radar capability indication information to a STA, where the first radar capability indication information is used to indicate whether the AP supports joint processing of a plurality of pieces of radar measurement data. Therefore, the STA may learn whether the AP supports coordinating a plurality of STAs to jointly perform radar measurement. In this way, if the AP can coordinate a plurality of STAs to jointly perform radar measurement, the STA may actively request the AP to coordinate a plurality of STAs to jointly perform radar measurement in a subsequent radar measurement procedure, to improve accuracy of radar measurement.

In an embodiment, the method further includes: The AP receives second radar capability indication information sent by a STA, where the second radar capability indication information is used to indicate whether the STA supports radar measurement. In this way, the AP can learn of a radar capability of the STA, to prevent the AP from scheduling a STA that does not support radar measurement to perform radar measurement, which affects proper execution of radar measurement.

In an embodiment, that the second radar capability indication information is used to indicate whether the STA supports radar measurement includes: The second radar capability indication information is used to indicate a radar type supported by the STA, where the radar type includes: a monostatic radar, a bistatic radar, and a multistatic radar.

According to a second aspect, a radar measurement method is provided. The method includes: A STA receives a first frame sent by an AP, where the first frame includes radar measurement information; and the STA determines the radar measurement information based on the first frame.

In an embodiment, the method further includes: The STA performs radar measurement based on the radar measurement information after receiving the first frame.

In an embodiment, the method further includes: The STA receives a first poll frame sent by the AP, where the first poll frame is used to trigger the STA to perform radar measurement; and the STA performs radar measurement based on the radar measurement information.

In an embodiment, the method further includes: The STA performs radar measurement based on the radar measurement information after obtaining a channel through contention.

In an embodiment, the radar measurement information includes at least one of the following parameters: a radar measurement start time point, a measurement periodicity, radar measurement duration, a measurement frequency band, radar measurement resource allocation information, a data feedback information indication, and a radar data feedback type.

In an embodiment, the method further includes: The STA receives a second frame sent by the AP, where the second frame is used to reserve a transmission opportunity for radar measurement; and the STA sends a third frame to the AP, where the third frame is used to respond to the second frame.

In an embodiment, the method further includes: The STA receives a fourth frame sent by the AP, where the fourth frame is used to request at least one STA to feed back radar measurement data; and the STA sends a sixth frame to the AP, where the sixth frame includes the radar measurement data.

In an embodiment, the method further includes: The STA receives a fifth frame sent by the AP, where the fifth frame is used to instruct at least one STA to be ready for feeding back radar measurement data; the STA receives a second poll frame sent by the AP, where the second poll frame is used to trigger the STA to feed back radar measurement data; and the STA sends a sixth frame to the AP, where the sixth frame includes the radar measurement data.

In an embodiment, the method further includes: The STA receives a third poll frame sent by the AP, where the third poll frame is used to trigger the STA to feed back radar measurement data; and the STA sends a sixth frame to the AP, where the sixth frame includes the radar measurement data.

In an embodiment, the radar measurement data includes at least one of the following parameters: a sequence ID, a timestamp, a sampling frequency, sampled data of a time domain signal, a fast Fourier transformation spectrum, a radar measurement result, and channel state information. The radar measurement result includes at least one of the following parameters: a range, a velocity, and an angle.

In an embodiment, the method further includes: The STA receives first radar capability indication information sent by the AP, where the first radar capability indication information is used to indicate whether the AP supports joint processing of a plurality of pieces of radar measurement data.

In an embodiment, the method further includes: The STA sends second radar capability indication information to the AP, where the second radar capability indication information is used to indicate whether the STA supports radar measurement.

In an embodiment, that the second radar capability indication information is used to indicate whether the STA supports radar measurement includes: The second radar capability indication information is used to indicate a radar type supported by the STA, where the radar type includes: a monostatic radar, a bistatic radar, and a multistatic radar.

According to a third aspect, an AP is provided, including a communication unit and a processing unit. The AP is configured to perform the method according to any design in the first aspect.

According to a fourth aspect, a STA is provided, including a communication unit and a processing unit. The STA is configured to perform the method according to any design in the second aspect.

According to a fifth aspect, a communication apparatus is provided. The communication apparatus includes a processor, where the processor is configured to perform the radar measurement method according to any design of the first aspect or the second aspect.

According to a sixth aspect, a computer-readable storage medium is provided. The computer-readable storage medium is configured to store instructions. When the instructions are read by a computer, the computer is configured to perform the radar measurement method according to any design in the first aspect or the second aspect.

According to a seventh aspect, a computer program is provided. The computer program includes instructions. When a computer reads the instructions, the computer performs the radar measurement method according to any possible design in the first aspect or the second aspect.

According to an eighth aspect, a chip is provided. The chip includes a processing circuit and a transceiver pin. In an embodiment, the chip further includes a memory. The processing circuit is configured to perform the radar measurement method according to any possible design in the first aspect or the second aspect. The transceiver pin is controlled by the processing circuit and is configured to perform the radar measurement method according to any possible design in the first aspect or the second aspect. The memory is configured to store instructions. The instructions are invoked by a processor to perform the radar measurement method according to any possible design in the first aspect or the second aspect.

According to a ninth aspect, a communication system is provided. The communication system includes an AP and a STA. The AP is configured to perform the radar measurement method according to any design in the first aspect. The STA is configured to perform the radar measurement method according to any design in the second aspect.

For technical effects brought by any implementation of the third aspect to the ninth aspect, refer to beneficial effects in the corresponding method provided above. Details are not described herein again.

BRIEF DESCRIPTION OF DRAWINGS

FIG. 19 is a schematic diagram of an FFT result field according to an embodiment of this application;

FIG. 20 is a schematic diagram of a feedback control field according to an embodiment of this application;

FIG. 21 is a schematic diagram of a Before FFT field according to an embodiment of this application;

FIG. 22 is a schematic diagram of an FFT info field according to an embodiment of this application;

FIG. 23 is a flowchart of a radar capability indication method according to an embodiment of this application;

DESCRIPTION OF EMBODIMENTS

In descriptions of this application, unless otherwise specified, "/" means "or". For example, A/B may represent A or B. The term "and/or" in this specification describes only an association relationship for associated objects and represents that three relationships may exist. For example, A and/or B may represent the following three cases: Only A exists, both A and B exist, and only B exists. "At least one" refers to one or more, and "a plurality of" refers to two or more. Words such as "first" and "second" do not limit a quantity and an execution sequence, and words such as "first" and "second" are not necessarily different.

It should be noted that, in this application, terms such as "example" or "for example" are used to represent giving an example, an illustration, or descriptions. Any embodiment or design scheme described as an "example" or "for example" in this application should not be explained as being more preferred or having more advantages than another embodiment or design scheme. Specifically, use of the word such as "example" or "for example" is intended to present a related concept in a specific manner.

In the descriptions of this application, the term "indication" may include a direct indication and an indirect indication, or may include an explicit indication and an implicit indication. Information indicated by a piece of information (for example, indication information described below) is referred to as to-be-indicated information. In a specific implementation process, there are a plurality of manners of indicating the to-be-indicated information. For example, the to-be-indicated information may be directly indicated, where the to-be-indicated information, an index of the to-be-indicated information, or the like is indicated. For another example, the to-be-indicated information may be indirectly indicated by indicating other information, and there is an association relationship between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

For ease of understanding, the following first briefly describes technical terms in embodiments of this application.

1. Radar Technology

Figure 1:
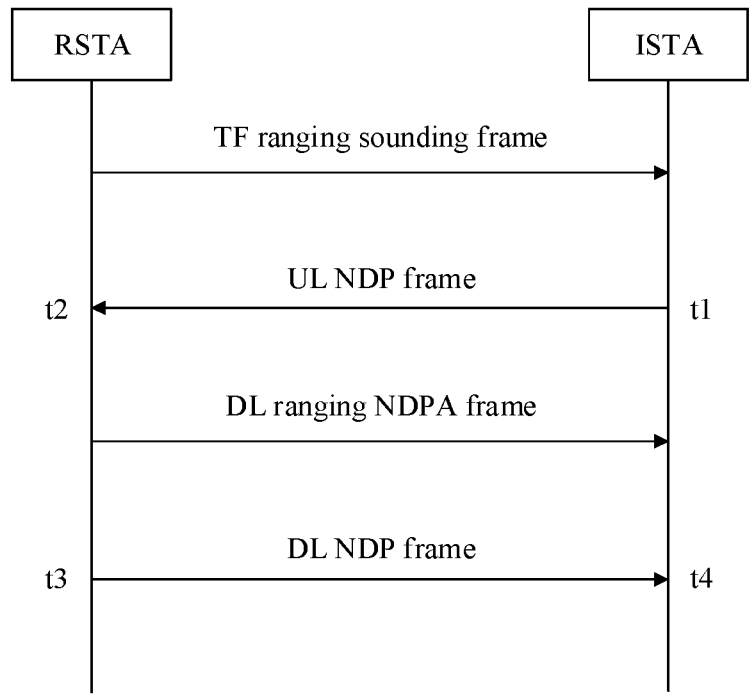
FIG. 1 is a flowchart of an FTM technology.
Figure 2:
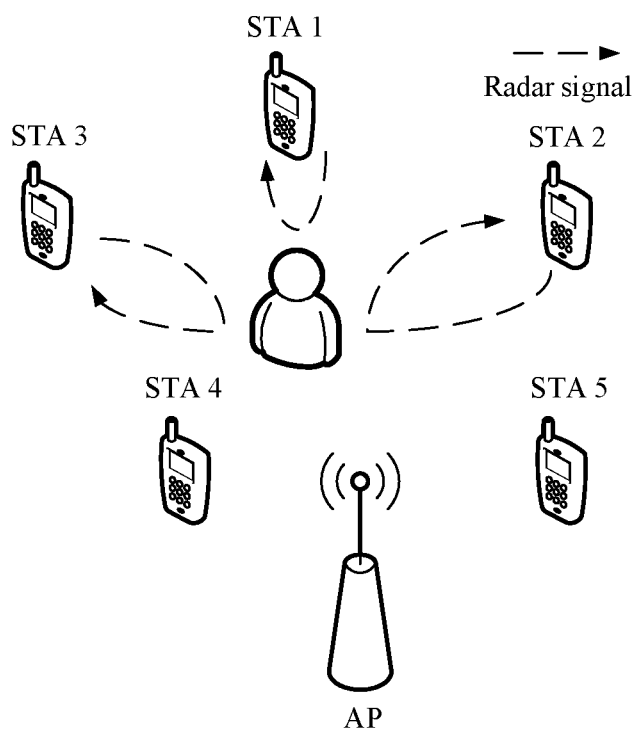
FIG. 2 is a schematic diagram of radar measurement according to an embodiment of this application.

Radar uses electromagnetic waves to detect a target object, to determine a spatial position of the object. As shown in FIG. 2, a radar emits electromagnetic waves to reflect off a target object and receives echoes from the target object, to obtain information about the target object such as a range, an azimuth, and a height to the radar.

Based on whether a transmitter and a receiver are co-located, radars can be divided into a monostatic radar, a bistatic radar, and a multistatic radar. For a monostatic radar, a transmitter and a receiver are co-located. For a bistatic radar or a multistatic radar, a receiver and a transmitter are physically separated.

2. Channel State Information (CSI)

Channel state information is used to reflect a channel state. In an embodiment, the channel state information may include at least one of a precoding matrix indicator (PMI), a rank indicator (RI), a channel quality indicator (CQI), a channel state information-reference signal resource indicator (CRI), a layer indicator (LI), and the like.

Technical solutions in this application are applied to a WLAN. A standard used for the WLAN may be an IEEE 802.11 standard, for example, an 802.11ac standard, an 802.11 ax standard, or a next-generation 802.11 standard. Scenarios to which the technical solutions in this application are applicable include: a communication scenario between an AP and a STA, a communication scenario between APs, a communication scenario between STAs, and the like. The AP may be a wireless router, a wireless transceiver, a wireless switch, or the like. The STA has different names, for example, a subscriber unit, an access terminal, a mobile station, a mobile device, a terminal, user equipment, and the like. During actual application, the STA may be a cellular phone, a smartphone, a wireless local loop (WLL), or another handheld device or computer device that has a wireless local area network communication function.

The technical solutions in this application may be further applied to a cellular communication system, for example, a fourth generation (4G) communication system or a fifth generation (5G) communication system. Scenarios to which the technical solutions in this application are applicable include: a communication scenario between a terminal and a base station, a communication scenario between terminals, a communication scenario between base stations, and the like.

The technical solutions in this application are mainly described from a communication scenario between an AP and a STA. For implementation of technical solutions in another scenario, refer to the communication scenario between the AP and the STA.

The following specifically describes the technical solutions provided in the embodiments of this application with reference to accompanying drawings of the specification of this application.

The radar technology is introduced to the WLAN. If nodes are not coordinated, a plurality of nodes may simultaneously perform radar measurement, so that radar waves of the plurality of nodes interfere with each other, and after each node receives a plurality of radar waves, the node is unable to identify a radar wave that is sent by a transmitting antenna of the node and that is reflected by an object to be measured. This leads to a collision between a plurality of radar measurement processes, and a related parameter (for example, a velocity, a range, and an angle) of the object to be measured cannot be effectively measured.

To avoid this collision, the AP needs to coordinate the plurality of STAs to perform radar measurement. In the embodiments of this application, a solution in which an AP coordinates a plurality of STAs to perform radar measurement may include at least one of the following solutions.

Solution 1

Figure 3:
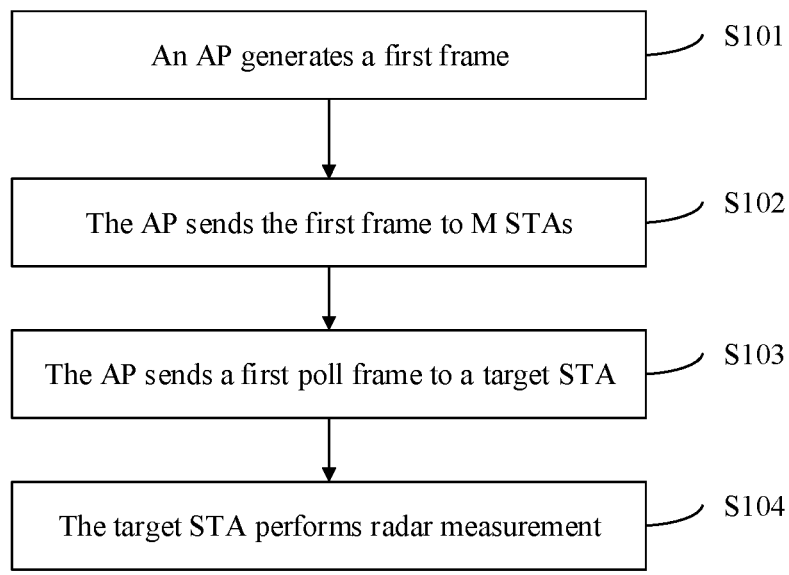
FIG. 3 is a flowchart of a radar measurement method according to an embodiment of this application.

FIG. 3 shows a radar measurement method according to an embodiment of this application. The method includes the following operations.

S101. An AP generates a first frame.

The first frame is used to configure radar measurement information for M STAs. M is a positive integer.

In an embodiment, the first frame may have another name, for example, a WiFi sensing trigger (WiFi sensing trigger) frame. This is not limited in this embodiment of this application.

The first frame includes the radar measurement information. In an embodiment, the radar measurement information includes at least one of the following parameters: a radar measurement start time point, a measurement periodicity, radar measurement duration, a measurement frequency band, radar measurement resource allocation information, a data feedback information indication, and a radar data feedback type. It may be understood that the radar measurement information may further include another parameter. This is not limited in this embodiment of this application.

(1) The radar measurement start time point is used to indicate a time point at which a STA starts to perform radar measurement.

(2) The measurement periodicity is used to indicate a time interval for a STA to receive and/or send a radar signal, or a time interval between two radar measurement processes of the STA.

(3) The radar measurement duration is used to indicate duration for which a radar measurement process of a STA lasts.

(4) The radar measurement frequency band is used to indicate a frequency band of a radar signal sent/received by a STA.

(5) The radar measurement resource allocation information is used to indicate a time domain resource, a frequency domain resource, and a space domain resource used when a STA performs radar measurement.

(6) The data feedback information indication is used to indicate related information when a STA feeds back radar measurement data, for example, a time domain resource, a frequency domain resource, and a space domain resource used when the STA feeds back the radar measurement data.

(7) The radar data feedback type is used to indicate content included in radar measurement data fed back by a STA, or indicate a part that is of the radar measurement data and that is specifically fed back by the STA. For example, the radar measurement data may include: sampled data of a time domain signal, an FFT spectrum, channel state information, and the like. The radar data feedback type may indicate only the sampled data of the time domain signal that the STA feeds back, or the radar data feedback type may indicate only the sampled data of the time domain signal and the FFT spectrum that the STA feeds back.

It should be noted that, when the radar measurement information configured by using the first frame includes the data feedback information indication and/or the radar data feedback type, the first frame may be further used to indicate one or more STAs in the M STAs to feed back radar measurement data after performing radar measurement.

It may be understood that, because the first frame is used to configure radar measurement information for the M STAs, any STA in the M STAs may determine, based on radar measurement information of another STA, related information (for example, a transmitting time point and a signal frequency band) about radar measurement performed by the another STA. This helps implement space, time, and phase synchronization between the M STAs, to coordinate the M STAs to jointly perform radar measurement, and reduce mutual interference between radar measurement processes of a plurality of STAs. Certainly, the plurality of STAs may alternatively implement space, time, and phase synchronization by using another procedure. This is not limited in this embodiment of this application.

It should be noted that, in the solution 1, the first frame may be used to instruct the M STAs to be ready for radar measurement. In this way, in a subsequent procedure, the AP may trigger, by using other signaling (for example, the first poll frame below), one or more STAs in the M STAs to perform radar measurement.

S102. The AP sends the first frame to the M STAs, so that the M STAs receive the first frame sent by the AP.

It should be noted that, after receiving the first frame, the STA may determine radar measurement information corresponding to the STA based on the first frame. For details on how the STA determines the radar measurement information corresponding to the STA based on the first frame, refer to the following descriptions. Details are not described herein again.

S103. The AP sends a first poll frame to a target STA, so that the target STA receives the first poll frame sent by the AP.

The target STA is any STA in the M STAs.

The first poll frame is used to trigger the target STA to perform radar measurement. For specific implementation of the first poll frame, refer to a poll frame in the conventional technology. Details are not described herein in this embodiment of this application.

In an embodiment, the first poll frame may carry a sequence ID, and the sequence ID is used to identify a radar measurement process performed by the target STA. In this way, in a subsequent procedure (for example, feeding back radar measurement data), information (for example, the sixth frame below) sent by the target STA may carry the sequence ID, to differ from a radar measurement process performed by another STA.

S104. The target STA performs radar measurement.

In an implementation, after receiving the first poll frame, the target STA performs radar measurement based on the radar measurement information in the first frame.

Figure 4:
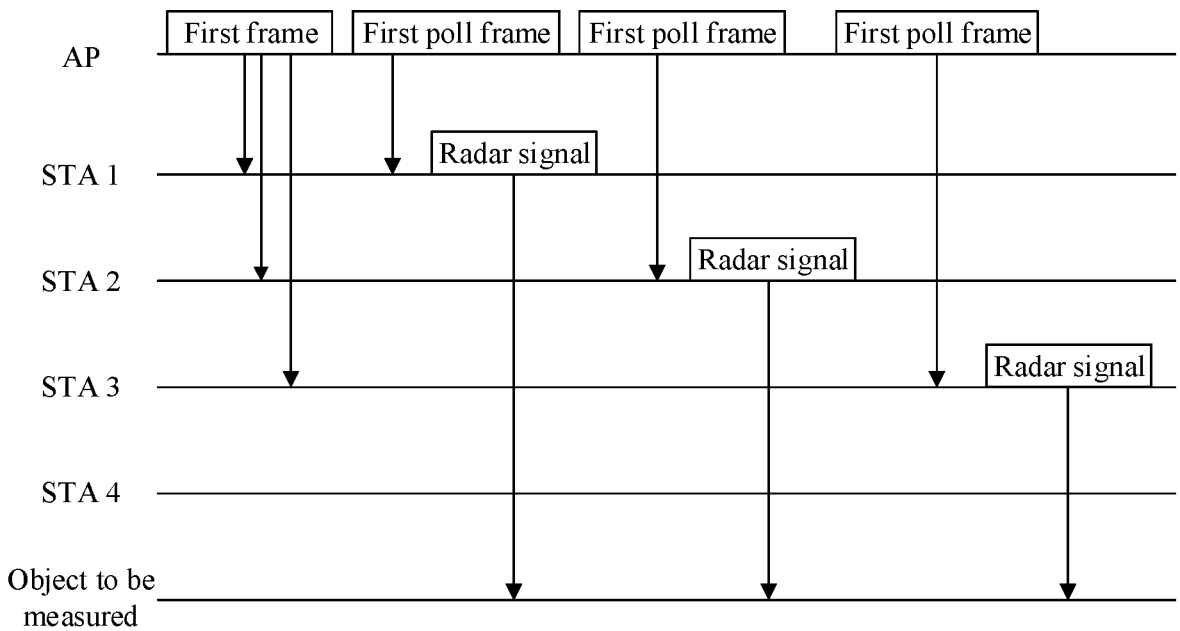
FIG. 4 is a schematic diagram depicting that an AP coordinates a plurality of STAs to perform radar measurement according to an embodiment of this application.

With reference to FIG. 4, for example, the AP sends the first frame to a STA 1, a STA 2, and a STA 3. At a timestamp #1, the AP sends the first poll frame to the STA 1, so that the STA 1 performs radar measurement. At a timestamp #2, the AP sends the first poll frame to the STA 2, so that the STA 2 performs radar measurement. At a timestamp #3, the AP sends the first poll frame to the STA 3, so that the STA 3 performs radar measurement.

It should be noted that, in a process in which the target STA performs radar measurement, the target STA may serve as a monostatic radar, to emit a radar wave and receive a corresponding echo. Alternatively, the target STA may serve as a transmitter of a bistatic radar/multistatic radar, to emit a radar wave. Alternatively, the target STA may serve as a receiver of a bistatic radar/multistatic radar, to receive an echo of a radar wave.

In an embodiment, when the target STA serves as the transmitter of the bistatic radar/multistatic radar, the AP may serve as a receiver of the bistatic radar/multistatic radar.

In an embodiment, when the target STA serves as the receiver of the bistatic radar/multistatic radar, the AP may serve as a transmitter of the bistatic radar/multistatic radar.

In this embodiment of this application, when the target STA sends a radar signal, the radar signal sent by the target STA may be a physical layer protocol data unit (PPDU) or a sequence, where the PPDU or the sequence has a radar measurement function.

In this embodiment of this application, for details about a specific implementation of the target STA to perform radar measurement, refer to the conventional technology. Details are not described in this embodiment of this application.

According to the technical solution shown in FIG. 3, the AP configures the radar measurement information for the M STAs by using the first frame, and triggers, by using the first poll frame, the target STA in the M STAs to perform radar measurement, to coordinate radar measurement processes of a plurality of STAs and reduce mutual interference between the radar measurement processes of the plurality of STAs.

Solution 2

Figure 5:
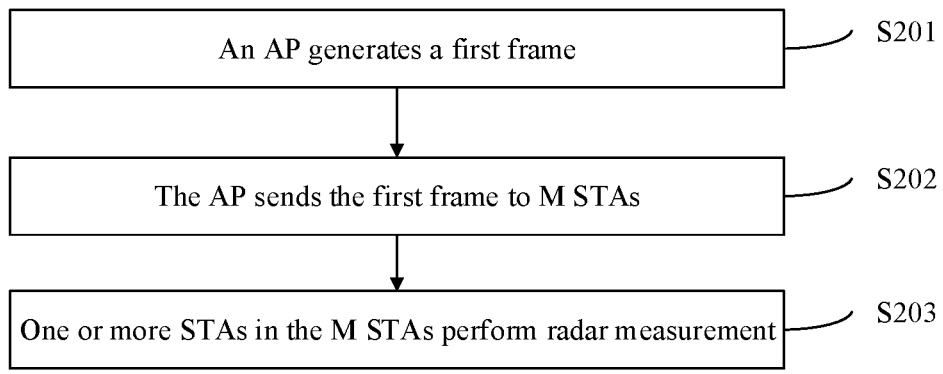
FIG. 5 is a flowchart of another radar measurement method according to an embodiment of this application.

FIG. 5 shows a radar measurement method according to an embodiment of this application. The method includes the following operations.

S201 and S202 are similar to operations S101 and S102. For detailed descriptions, refer to the embodiment shown in FIG. 3. Details are not described herein again.

It should be noted that, in the solution 2, the first frame may be used to instruct each STA in the M STAs to perform radar measurement. In other words, the AP may trigger, by using the first frame, the M STAs to perform radar measurement. In this way, compared with the solution 1, the AP does not need to send other signaling to trigger the STA to perform radar measurement. This reduces signaling overheads.

S203. One or more STAs in the M STAs perform radar measurement.

In an implementation, for one STA in the M STAs, after receiving the first frame, the STA may perform radar measurement based on the radar measurement information in the first frame.

Figure 6:
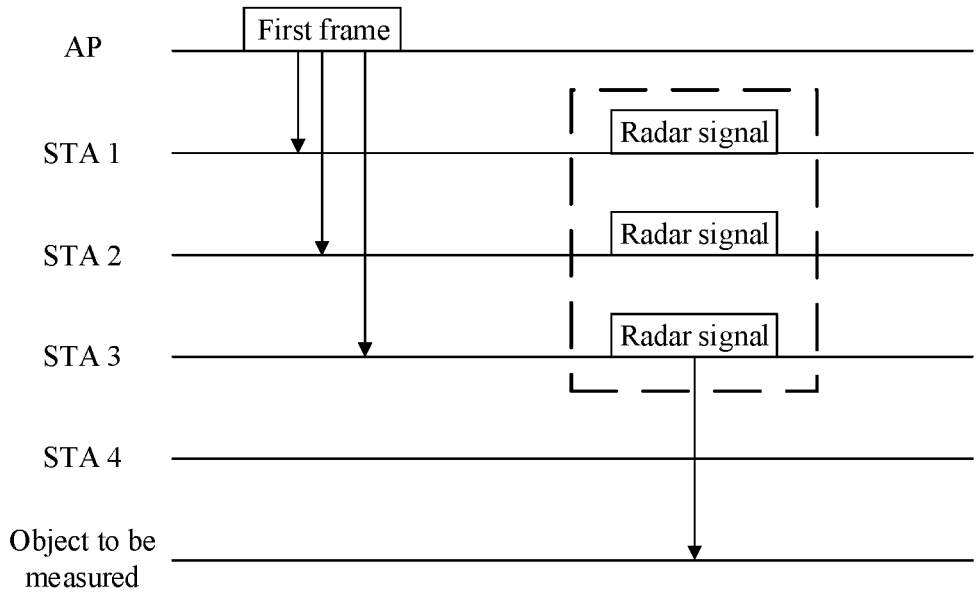
FIG. 6 is another schematic diagram depicting that an AP coordinates a plurality of STAs to perform radar measurement according to an embodiment of this application.

With reference to FIG. 6, for example, the AP sends the first frame to a STA 1, a STA 2, and a STA 3. Then, the STA 1, the STA 2, and the STA 3 perform radar measurement.

It should be noted that, when the M STAs perform radar measurement, each STA in the M STAs may serve as a monostatic radar. Alternatively, a portion of the M STAs may serve as transmitters of a bistatic radar/multistatic radar, and another portion of the STAs may serve as receivers of the bistatic radar/multistatic radar. Alternatively, each STA in the M STAs may serve as a transmitter of a bistatic radar/multistatic radar. Alternatively, each STA in the M STAs may serve as a receiver of a bistatic radar/multistatic radar.

It should be noted that, when the M STAs perform radar measurement, the AP may also participate in radar measurement. The AP may serve as a monostatic radar, a transmitter of a bistatic radar/multistatic radar, or a receiver of a bistatic radar/multistatic radar.

In an embodiment, if each STA in the M STAs serves as the receiver of the bistatic radar/multistatic radar, the AP may serve as the transmitter of the bistatic radar/multistatic radar.

In an embodiment, if each STA in the M STAs serves as the transmitter of the bistatic radar/multistatic radar, the AP may serve as the receiver of the bistatic radar/multistatic radar.

It should be noted that, when a plurality of STAs in the M STAs serve as transmitters, radar signals sent by each STA as the transmitter may be orthogonal, for example, orthogonal in frequency domain or orthogonal in code domain, to reduce mutual interference between radar signals sent by a plurality of STAs.

In this embodiment of this application, a radar signal sent by a STA that serves as the transmitter in the M STAs may be a PPDU or a sequence, where the PPDU or the sequence has a radar measurement function.

According to the technical solution shown in FIG. 5, the AP sends the first frame to trigger a plurality of STAs to perform radar measurement, to coordinate radar measurement processes of the plurality of STAs, and reduce mutual interference between radar measurement processes of the plurality of STAs.

Solution 3

Figure 7:
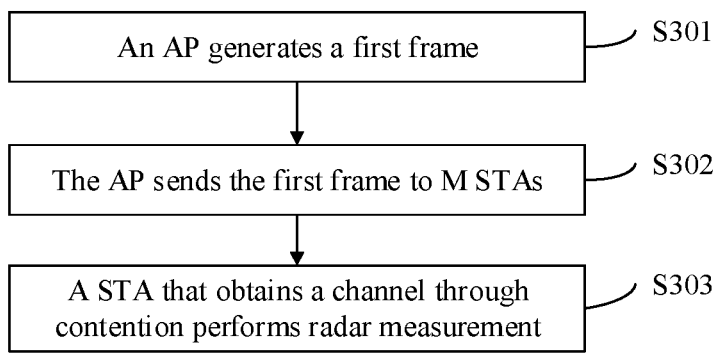
FIG. 7 is a flowchart of another radar measurement method according to an embodiment of this application.

FIG. 7 shows a radar measurement method according to an embodiment of this application. The method includes the following operations.

S301 and S302 are similar to operations S101 and S102. For detailed descriptions, refer to the embodiment shown in FIG. 3. Details are not described herein again.

It should be noted that, in the solution 3, the first frame is used to instruct a STA that obtains a channel through contention in the M STAs to perform radar measurement. In other words, the AP may trigger, by using the first frame, the STA that obtains the channel through contention in the M STAs to perform radar measurement. In this way, compared with the solution 1, the AP does not need to send other signaling to trigger the STA to perform radar measurement. This reduces signaling overheads.

S303. The STA that obtains the channel through contention performs radar measurement.

In an implementation, after the M STAs receive the first frame, each STA in the M STAs performs channel contention. The STA that obtains the channel through contention performs radar measurement based on the radar measurement information in the first frame. For a specific procedure of channel contention, refer to the conventional technology. Details are not described herein in this embodiment of this application.

Figure 8:
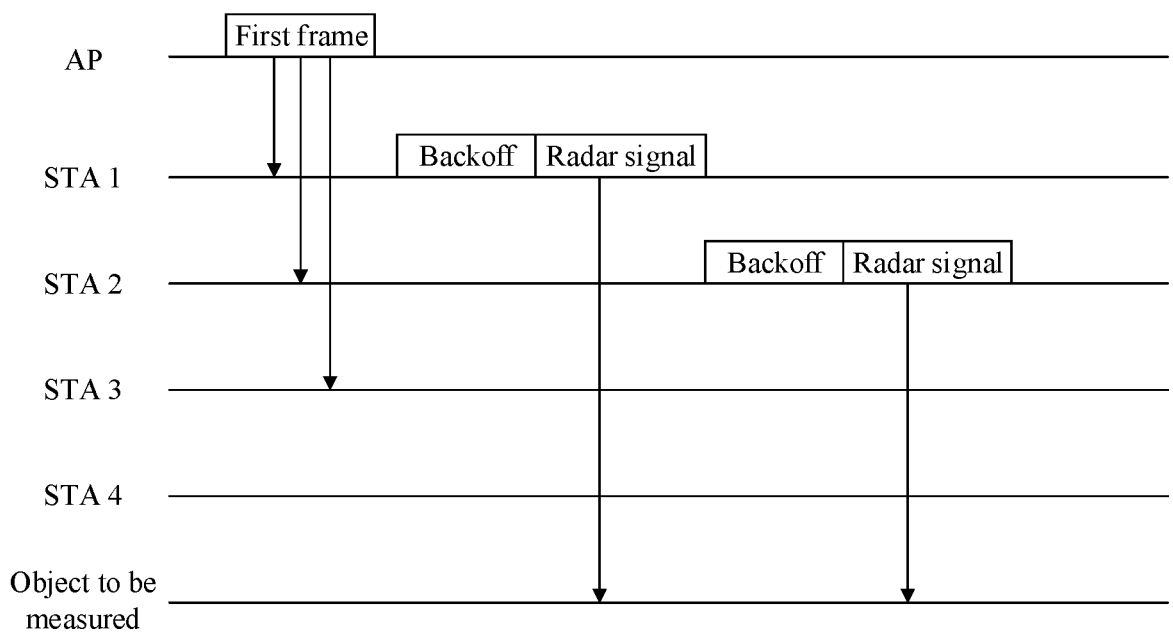
FIG. 8 is another schematic diagram depicting that an AP coordinates a plurality of STAs to perform radar measurement according to an embodiment of this application.

With reference to FIG. 8, for example, the AP sends the first frame to a STA 1, a STA 2, and a STA 3. Then, the STA 1, the STA 2, and the STA 3 start to perform channel contention. At a first time point, the STA 1 first obtains the channel through contention. Therefore, the STA 1 first performs radar measurement. At a second time point, the STA 2 also obtains the channel through contention, and the STA 2 also starts to perform radar measurement.

It should be noted that, in FIG. 8, backoff represents a random backoff process. The random backoff process refers to a random backoff process that each node undergoes when contending for a channel. At the beginning of this process, the node first selects, in a contention window, a random backoff count value that is based on a random number. In addition, in each time unit (for example, a slot), the node monitors whether a channel is idle. If the channel is idle, the node performs a countdown, that is, the count value is subtracted by 1. If the channel is busy, a countdown is not performed correspondingly. When the random backoff count value falls back to 0, the node can send data.

It should be noted that, the STA that obtains the channel through contention may serve as a monostatic radar, a transmitter of a bistatic radar/multistatic radar, or a receiver of a bistatic radar/multistatic radar.

In this embodiment of this application, the AP and a STA that does not obtain a channel through contention in the M STAs may also participate in radar measurement.

In an embodiment, when the STA that obtains the channel through contention serves as the transmitter of the bistatic radar/multistatic radar, the AP may serve as the receiver of the bistatic radar/multistatic radar, and the STA that does not obtain the channel through contention may also serve as the receiver of the bistatic radar/multistatic radar.

In an embodiment, when the STA that obtains the channel through contention serves as the receiver of the bistatic radar/multistatic radar, the AP may serve as the transmitter of the bistatic radar/multistatic radar.

In this embodiment of this application, a radar signal sent by a STA that serves as the transmitter (for example, the STA that obtains the channel through contention) in the M STAs may be a PPDU or a sequence having a radar measurement function.

According to the technical solution shown in FIG. 7, the AP sends the first frame to the M STAs, to instruct the STA that obtains the channel through contention in the M STAs to perform radar measurement. In this way, radar measurement processes of a plurality of STAs are coordinated, and mutual interference between radar measurement of the plurality of STAs is reduced.

It should be noted that the AP may use the foregoing three coordination solutions. Therefore, to facilitate the STA to execute a corresponding coordination solution, the AP and the STA may communicate in advance to determine a coordination solution to be used, a protocol predefines a coordination solution to be used between the AP and the STA, or the first frame includes indication information indicating a coordination solution to be used between the AP and the STA.

In this embodiment of this application, the foregoing three coordination solutions may also be referred to as three modes. The solution 1 may be denoted as a first mode, the solution 2 may be denoted as a second mode, and the solution 3 may be denoted as a third mode.

The first mode may also be referred to as a polling mode. In the first mode, the first frame is used to instruct the M STAs to perform radar measurement based on the first mode (or the polling mode).

The second mode may also be referred to as a scheduling mode. In the second mode, the first frame is used to instruct the M STAs to perform radar measurement based on the second mode (or the scheduling mode).

The third mode may also be referred to as a contention mode. In the third mode, the first frame is used to instruct the M STAs to perform radar measurement based on the third mode (or the contention mode).

The following describes a frame structure of the first frame, so that a person skilled in the art understands the first frame.

It should be noted that the AP may coordinate radar measurement processes of a plurality of STAs by using the foregoing solution 1 to solution 3. Therefore, the first frame may include a first identifier, and the first identifier is used to indicate a coordination solution to be used by the AP. In an embodiment, the first identifier may be carried in a common information field in the first frame. This is not limited in this embodiment of this application.

It should be noted that a user information field in the first frame may include a second identifier, and the second identifier may be used to indicate whether a STA corresponding to the user information field in a radar measurement process serves as a transmitter or a receiver of a bistatic radar/multistatic radar.

In an embodiment, the first frame may be a trigger frame, an announcement frame, or a poll frame. A specific implementation of the first frame is not limited in this embodiment of this application.

For example, in a low frequency scenario, in the solution 1 or the solution 2, the first frame may be a trigger frame or a poll frame. In solution 3, the first frame may be an announcement frame or a poll frame. In a high frequency scenario, in the solution 1 to the solution 3, the first frame may be a poll frame.

In a first implementation, the first frame is a trigger frame.

Figure 9:
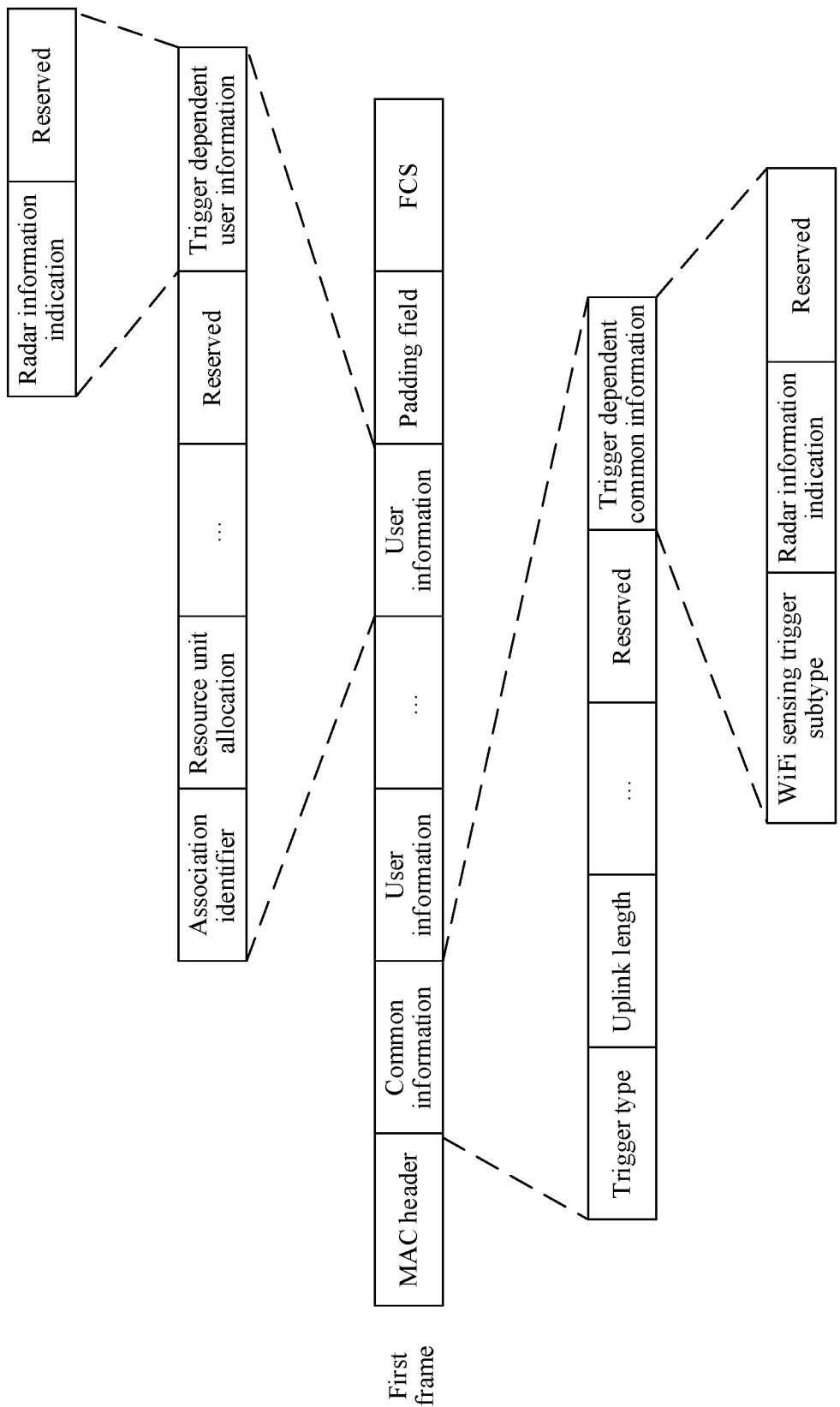
FIG. 9 is a schematic diagram of a frame structure of a first frame according to an embodiment of this application.

FIG. 9 is a schematic diagram of a frame structure of the first frame. The first frame includes a MAC header, common information (common info), one or more pieces of user information (user info), a padding field, and a frame check sequence (FCS).

(1) Common Information Field

The common information field includes at least one of the following bit fields: a trigger type field, an uplink length field, a reserved field, and a trigger dependent common information field.

In an embodiment, a value of the trigger type field in the common information field in the first frame is a preset value, to indicate that an operation type of the first frame is WiFi sensing, that is, to indicate that the first frame is used for radar measurement. The preset value may be any one of reserved values of a trigger type field in a common information field in a current trigger frame.

For example, Table 1 shows values of a trigger type field in a trigger frame and a meaning corresponding to each value. In Table 1, the preset value is 9.

TABLE 1

| Trigger type field value | Trigger frame variant (trigger frame variant) |
|---|---|
| 0 | Basic (Basic) |
| ... | ... |
| 8 | Ranging (Ranging) |
| 9 | WiFi sensing |
| 10-15 | Reserved |

The trigger dependent common information field includes at least one of the following fields: a WiFi sensing trigger subtype field, a radar information indication field, and a reserved field.

In an embodiment, the WiFi sensing trigger subtype field is used to indicate a subtype of the first frame. The subtype of the first frame includes at least a first subtype and a second subtype. The first subtype may be referred to as a radar subtype, the second subtype may be referred to as a report subtype, and the first subtype and the second subtype may have other names. This is not limited in this embodiment of this application.

In an embodiment, the first frame of the radar subtype is used to indicate whether the M STAs perform radar measurement on a same channel/frequency band, and/or the first frame of the radar subtype is further used to indicate radar measurement information, for example, a radar measurement start time point, radar measurement duration, a measurement periodicity, and a radar data feedback type.

In an embodiment, the first frame of the report subtype is used to indicate an information type of radar measurement data fed back by a STA. The information type of the radar measurement data includes: sampled data of a time domain signal, channel state information, a radar measurement data result, an FFT spectrum, and the like.

For example, Table 2 shows a correspondence between a value of a WiFi sensing trigger subtype field and a subtype. For description with reference to Table 2, that a value of the WiFi sensing trigger subtype field is 0 indicates that the subtype of the first frame is radar. That a value of the WiFi sensing trigger subtype field is 1 indicates that the subtype of the first frame is report. 2 or 3 is a reserved value for the WiFi sensing trigger subtype field. The reserved value for the WiFi sensing trigger subtype field may be used to indicate another subtype in a future scenario.

TABLE 2

| WiFi sensing trigger subtype field value | Subtype |
|---|---|
| 0 | Radar |
| 1 | Report |
| 2-3 | Reserved |

(2) User Information Field

The user information field includes at least one of the following bit fields: an association identifier (AID) field, a resource unit allocation (RU allocation) field, a trigger dependent user information (trigger dependent user info) field, and a reserved field.

The AID field is used to indicate a station corresponding to the user information field.

The resource unit allocation field is used to indicate a resource unit allocated to the station corresponding to the user information field. The resource unit is a frequency domain resource, and the resource unit includes one or more subcarriers.

The trigger dependent user information field is used to indicate a part of radar measurement information of the station corresponding to the user information field.

It should be noted that the first frame is used to configure radar measurement information for the M STAs. A specific implementation thereof may include the following method:

(1) The trigger dependent common information field in the first frame carries all radar measurement information, where the radar measurement information carried in the trigger dependent common information field is applicable to the M STAs. In other words, the M STAs determine corresponding radar measurement information based on the trigger dependent common information field in the first frame.

(2) The first frame includes M user information fields, and each user information field in the M user information fields corresponds to one STA in the M STAs. A trigger dependent user information field in the user information field corresponding to each STA is used to carry all radar measurement information corresponding to the STA.

(3) The first frame includes M user information fields, and each user information field in the M user information fields corresponds to one STA in the M STAs. A trigger dependent user information field in the user information field corresponding to each STA is used to carry a part of radar measurement information corresponding to the STA. Further, the trigger dependent common information field in the first frame is used to carry a part of radar measurement information. It may be understood that the part of radar measurement information carried in the trigger dependent common information field is applicable to the M STAs. In this way, a STA may determine complete radar measurement information based on the part of radar measurement information carried in the trigger dependent common information field and a part of radar measurement information carried in a corresponding user information field.

Figure 29:
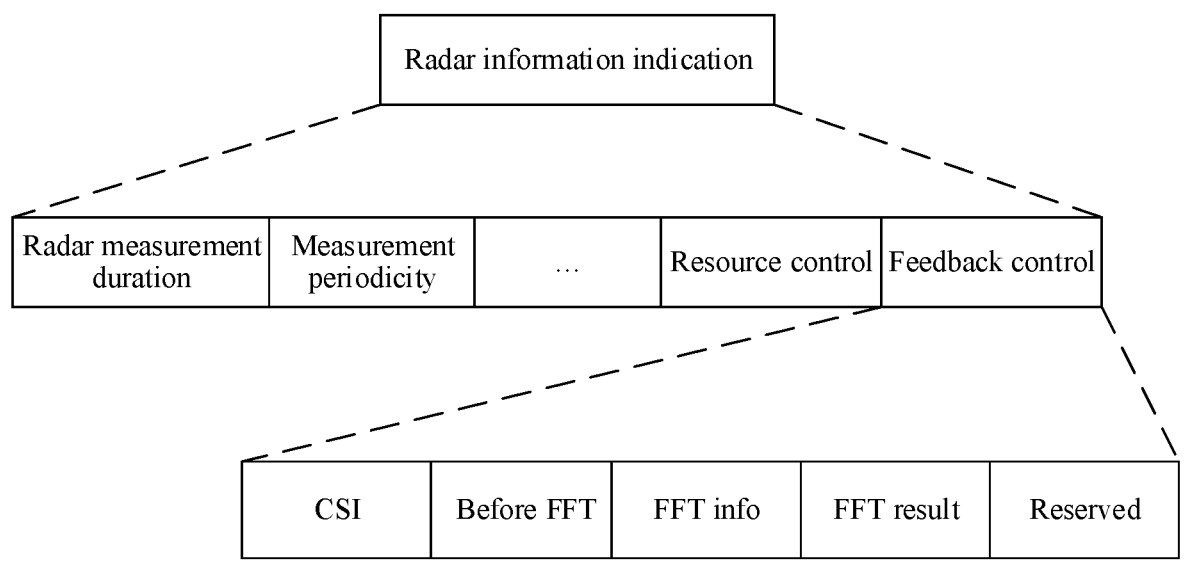
FIG. 29 is a schematic diagram of a radar information indication field according to an embodiment of this application.

It should be noted that, for the user information field or the common information field, a radar information indication field is used to carry radar measurement information. In an embodiment, a structure of the radar information indication field may refer to FIG. 29. The radar information indication field may include the following bit fields: a radar measurement duration field, a radar measurement periodicity (or referred to as a radar measurement interval) field, a resource control field, and a feedback control field.

The resource control field is used to carry a data feedback information indication in the radar measurement information.

The feedback control field is used to indicate a radar data feedback type. The feedback control field includes at least one of the following bit fields: a CSI field, a Before FFT field, an FFT info field, an FFT result field, and a reserved field. The CSI field is used to indicate whether a STA feeds back CSI. The Before FFT field is used to indicate whether the STA feeds back sampled data of a time domain signal. The FFT info field is used to indicate whether the STA feeds back an FFT spectrum. The FFT result field is used to indicate whether the STA feeds back radar measurement data.

In a second implementation, the first frame is an announcement frame.

Figure 30:
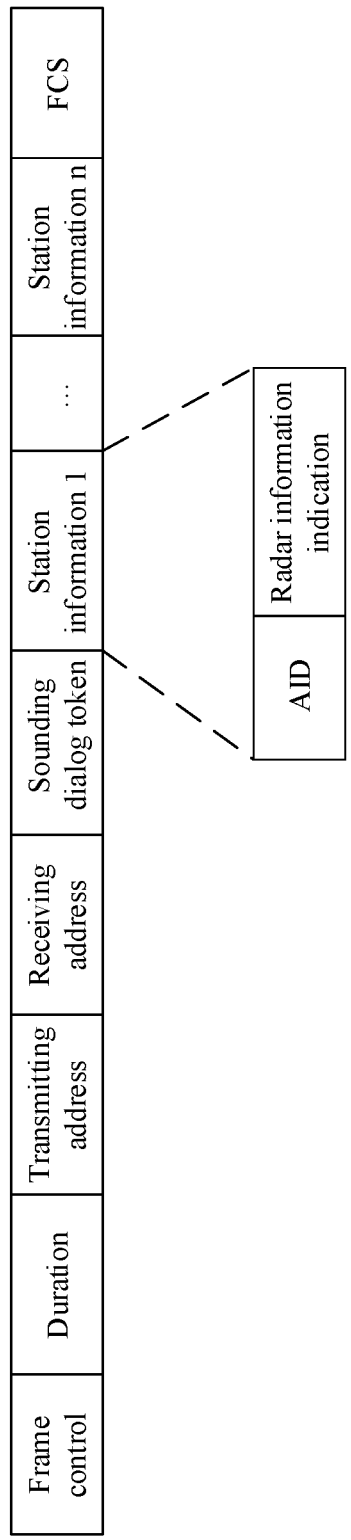
FIG. 30 is a schematic diagram of a frame structure of another first frame according to an embodiment of this application.

As shown in FIG. 30, the first frame includes at least one of the following bit fields: a frame control field, a duration field, a receiving address (RA) field, a transmitting address (TA) field, a sounding dialog token field, one or more station information fields, and an FCS field.

(1) A value of the sounding dialog token field in the first frame is a preset value, and is used to indicate that the first frame is used to announce that the STA performs radar measurement. In other words, if a value of a sounding dialog token field in an announcement frame is a preset value, it indicates that the announcement frame is the first frame, and the announcement frame is used to announce that the STA performs radar measurement.

(2) Station information may include an AID and a radar information indication. The radar information indication field may carry radar measurement information of a STA corresponding to the station information. For the radar information indication field, refer to the foregoing description. This is not limited in this embodiment of this application.

The foregoing describes the first frame, and details are not described in the following again.

Figure 10:
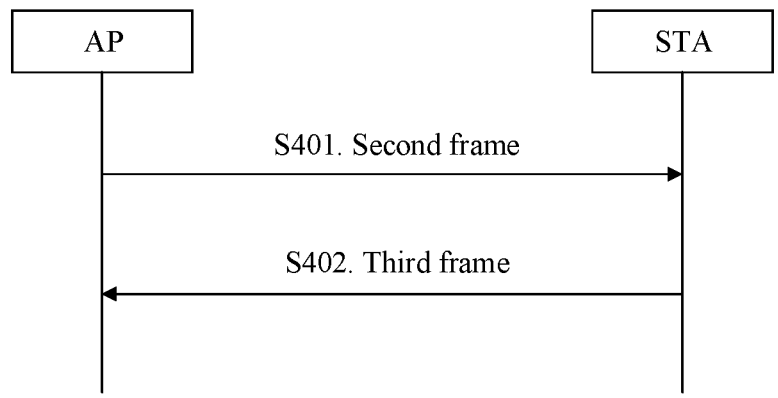
FIG. 10 is a flowchart of another radar measurement method according to an embodiment of this application.

In an embodiment, before the AP sends the first frame, as shown in FIG. 10, the radar measurement method further includes the following operations S401 and S402.

S401. The AP sends a second frame.

The second frame is used to reserve a transmission opportunity (TXOP) for radar measurement. In an embodiment, the second frame may be a multi-user request to send (MU-RTS) frame or a request to send (RTS) frame.

In a low frequency scenario, the AP sends the second frame to a plurality of STAs in a broadcast or multicast manner. In this case, the second frame may be an MU-RTS frame.

In a high frequency scenario, the AP directionally sends the second frame to each STA. In this case, the second frame may be an RTS frame. It may be understood that, the AP sends the second frame to the STA in a directional manner, so that it can prevent signal attenuation in a high frequency scenario from affecting receiving of the second frame by the STA.

S402. A STA that receives the second frame sends a third frame to the AP.

The third frame is used to respond to the second frame. In an embodiment, the third frame may be a clear to send (CTS) frame or a DMG CTS frame.

In a low frequency scenario, the STA that receives the second frame sends the third frame to the AP. In this case, the third frame may be a CTS frame.

In a high frequency scenario, the STA that receives the second frame sends the third frame to the AP in a directional manner. In this case, the third frame may be a DMG CTS frame.

According to the technical solution shown in FIG. 10, the AP interacts with the STA by using the second frame and the third frame, to reserve a transmission opportunity for radar measurement, so that the STA can then properly perform radar measurement.

After the STA performs radar measurement, the AP requires the STA to report radar measurement data, so that the AP analyzes information such as a location and a velocity of a measured object based on the radar measurement data reported by the STA. In the embodiments of this application, a radar measurement data feedback solution includes at least one of the following solutions.

Feedback Solution 1:

If radar measurement information configured in the first frame for a STA includes a data feedback information indication and/or a radar data feedback type, after the STA performs radar measurement, the STA sends radar measurement data to the AP based on the data feedback information indication and/or the radar data feedback type in the radar measurement information.

Figure 11:
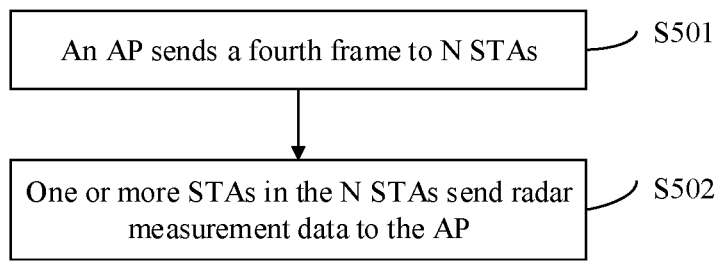
FIG. 11 is a flowchart of a radar measurement data feedback method according to an embodiment of this application.

Feedback Solution 2:

FIG. 11 shows a radar measurement data feedback method according to an embodiment of this application. The method includes the following operations.

S501. The AP sends a fourth frame to N STAs, so that the N STAs receive the fourth frame.

The N STAs belong to the M STAs. In other words, the N STAs are a subset of the M STAs. N is a positive integer less than or equal to M.

The fourth frame is used to request each STA in the N STAs to feed back radar measurement data to the AP. In an embodiment, the fourth frame may include configuration information. The configuration information is used to instruct the STA to feed back related information about the radar measurement data, for example, a feedback time point, a time domain resource, a frequency domain resource, and a space domain resource.

In this embodiment of this application, the fourth frame may have another name, for example, a radar feedback trigger frame (radar feedback trigger frame). This is not limited in this embodiment of this application.

S502. One or more STAs in the N STAs send radar measurement data to the AP, so that the AP receives the radar measurement data sent by the one or more STAs in the N STAs.

Implementation 1: After receiving the fourth frame, the one or more STAs in the N STAs send radar measurement data to the AP.

Figure 12:
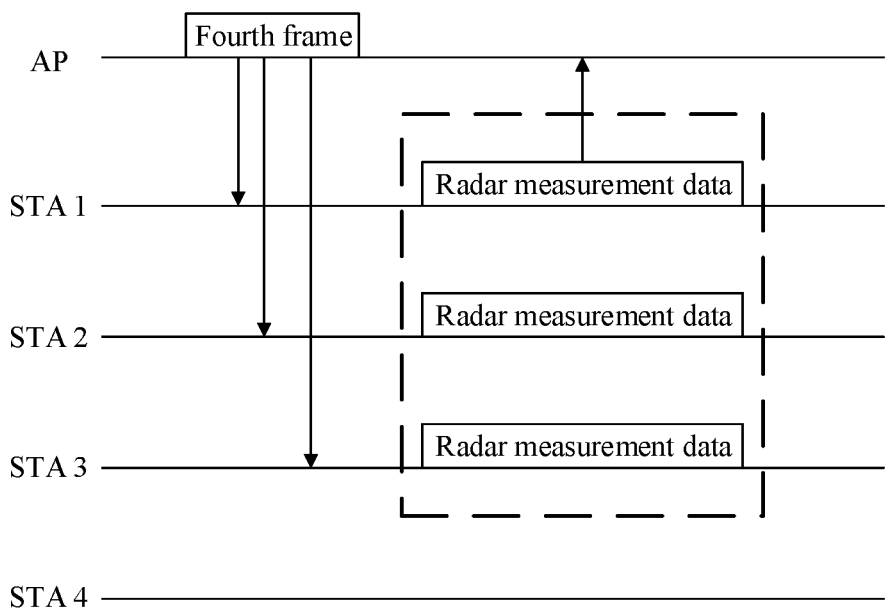
FIG. 12 is a schematic diagram depicting that an AP coordinates a plurality of STAs to feed back radar measurement data according to an embodiment of this application.

With reference to FIG. 12, the implementation 1 is described by using an example, where the AP sends the fourth frame to the STA 1, the STA 2, and the STA 3, and the STA 1, the STA 2, and the STA 3 send radar measurement data to the AP at a timestamp #1.

It should be noted that, when the N STAs simultaneously feed back radar measurement data to the AP, the STA may use either a multiple-input multiple-output (MIMO) technology or an orthogonal frequency division multiple access (OFDMA) technology.

Implementation 2: Each STA in the N STAs sends radar measurement data to the AP based on the feedback time point configured in the fourth frame. It may be understood that, in the fourth frame, a corresponding feedback time point may be separately configured for each STA in the N STAs, or a same feedback time point may be configured for all STAs in the N STAs.

Figure 13:
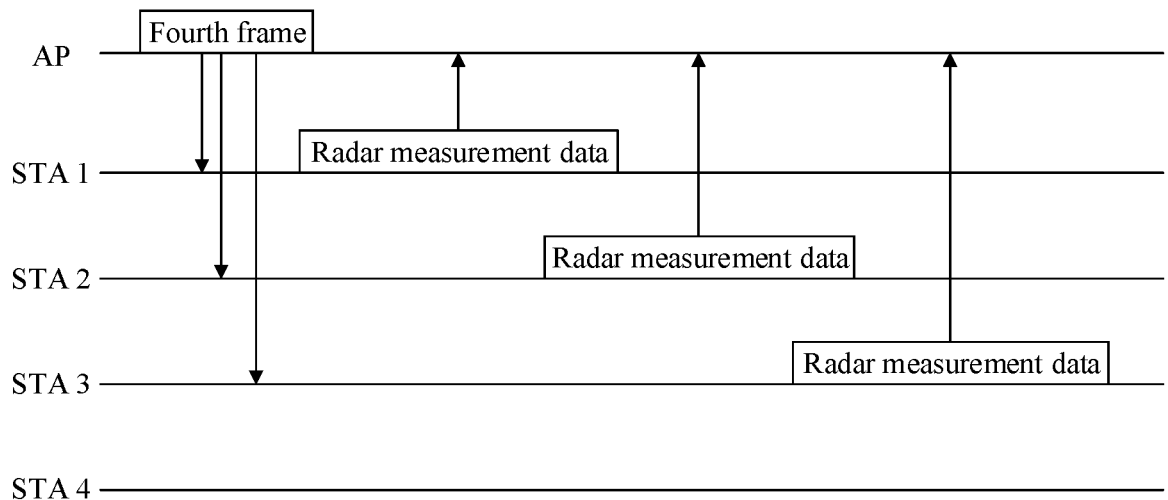
FIG. 13 is another schematic diagram depicting that an AP coordinates a plurality of STAs to feed back radar measurement data according to an embodiment of this application.

With reference to FIG. 13, the implementation 2 is described by using an example, where the AP sends the fourth frame to the STA 1, the STA 2, and the STA 3. In the fourth frame, a feedback time point configured for the STA 1 is a timestamp #1, a feedback time point configured for the STA 2 is a timestamp #2, and a feedback time point configured for the STA 3 is a timestamp #3. Therefore, the STA 1 sends the radar measurement data to the AP at the timestamp #1, the STA 2 sends the radar measurement data to the AP at the timestamp #2, and the STA 3 sends the radar measurement data to the AP at the timestamp #3.

According to the technical solution shown in FIG. 11, the AP sends the fourth frame to the N STAs, to trigger the N STAs to feed back radar measurement data, so that a plurality of STAs can sequentially report radar measurement data to the AP.

Figure 14:
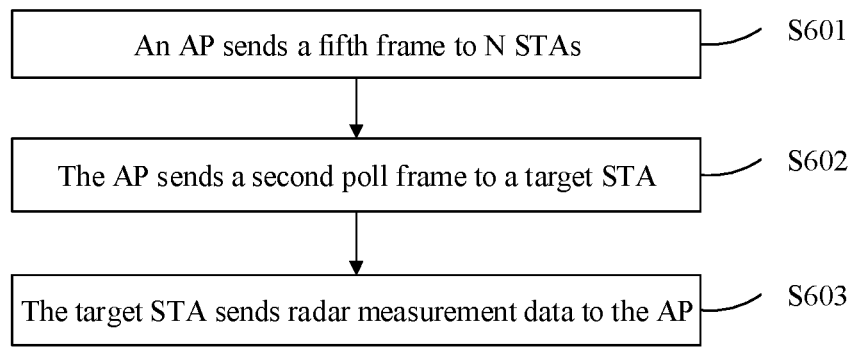
FIG. 14 is a flowchart of another radar measurement data feedback method according to an embodiment of this application.

Feedback Solution 3:

FIG. 14 shows another radar measurement data feedback method according to an embodiment of this application. The method includes the following operations.

S601. The AP sends a fifth frame to N STAs, so that each STA in the N STAs receives the fifth frame.

The N STAs belong to the M STAs. In other words, the N STAs are a subset of the M STAs. N is a positive integer.

The fifth frame is used to instruct the N STAs to be ready for feeding back radar measurement data. In an embodiment, the fifth frame may include configuration information. The configuration information includes a radar measurement data feedback time point and the like.

In this embodiment of this application, the fifth frame may have another name, for example, a WiFi sensing report announcement frame (WiFi sensing report announcement frame). This is not limited in this embodiment of this application.

S602. The AP sends a second poll frame to a target STA, so that the target STA receives the second poll frame sent by the AP.

The target STA may be any STA in the N STAs.

The second poll frame is used to instruct the target STA to feed back radar measurement data. In an embodiment, for specific implementation of the second poll frame, refer to a poll frame in the conventional technology. Details are not described herein in this embodiment of this application.

S603. The target STA sends radar measurement data to the AP, so that the AP receives the radar measurement data sent by the target STA.

Figure 15:
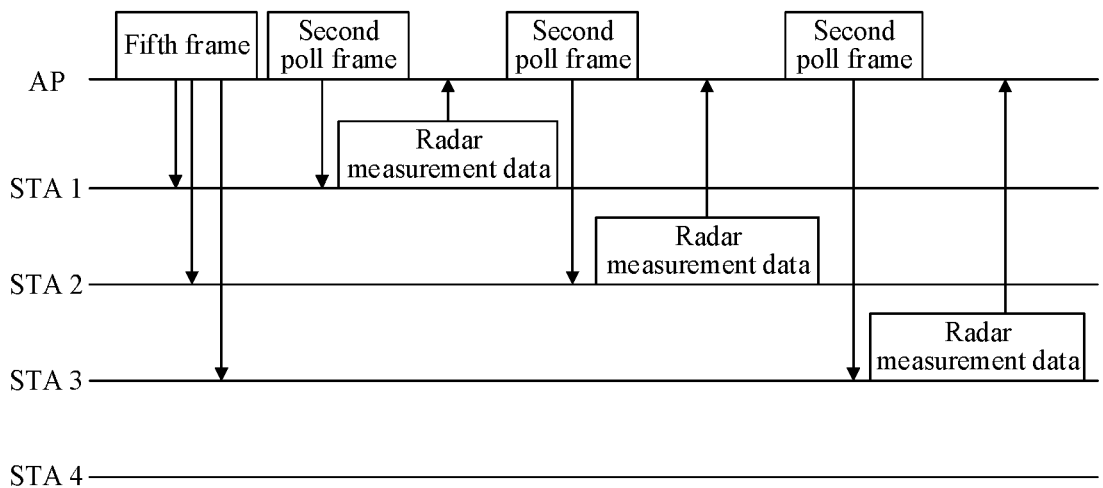
FIG. 15 is another schematic diagram depicting that an AP coordinates a plurality of STAs to feed back radar measurement data according to an embodiment of this application.

With reference to FIG. 15, for example, the AP sends the fifth frame to the STA 2 and the STA 3. The AP sends the second poll frame to the STA 2, so that the STA 2 feeds back radar measurement data to the AP. Then, the AP sends the second poll frame to the STA 3, so that the STA 3 feeds back radar measurement data to the AP.

According to the technical solution shown in FIG. 14, the AP sends the fifth frame to the N STAs, so that the N STAs are ready for feeding back radar measurement data. Then, the AP separately sends the second poll frame to different STAs, so that a STA that receives the second poll frame feeds back radar measurement data. In this way, a plurality of STAs can sequentially report radar measurement data to the AP.

Figure 16:
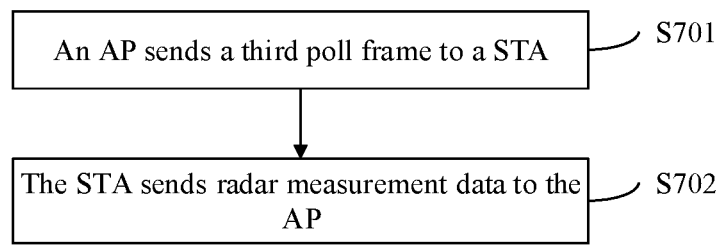
FIG. 16 is a flowchart of another radar measurement data feedback method according to an embodiment of this application.

Feedback Solution 4:

FIG. 16 shows another radar measurement data feedback method according to an embodiment of this application. The method includes the following operations.

S701. The AP sends a third poll frame to a STA, so that the STA receives the third poll frame sent by the AP.

The third poll frame is used to instruct the STA to feed back radar measurement data. In an embodiment, the third poll frame may include configuration information. The configuration information includes a radar measurement data feedback time point and the like.

In an embodiment, the third poll frame may be a poll frame specifically used to trigger the STA to feed back radar measurement data.

In this embodiment of this application, the third poll frame may have another name, for example, a WiFi sensing report poll frame (WiFi sensing report poll frame). This is not limited in this embodiment of this application.

S702. The STA sends radar measurement data to the AP, so that the AP receives the radar measurement data sent by the STA.

It should be noted that FIG. 16 describes a radar measurement data feedback process of only one STA in a plurality of STAs that perform radar measurement. Another STA performing radar measurement may also refer to the technical solution shown in FIG. 16 to feed back radar measurement data.

Figure 17:
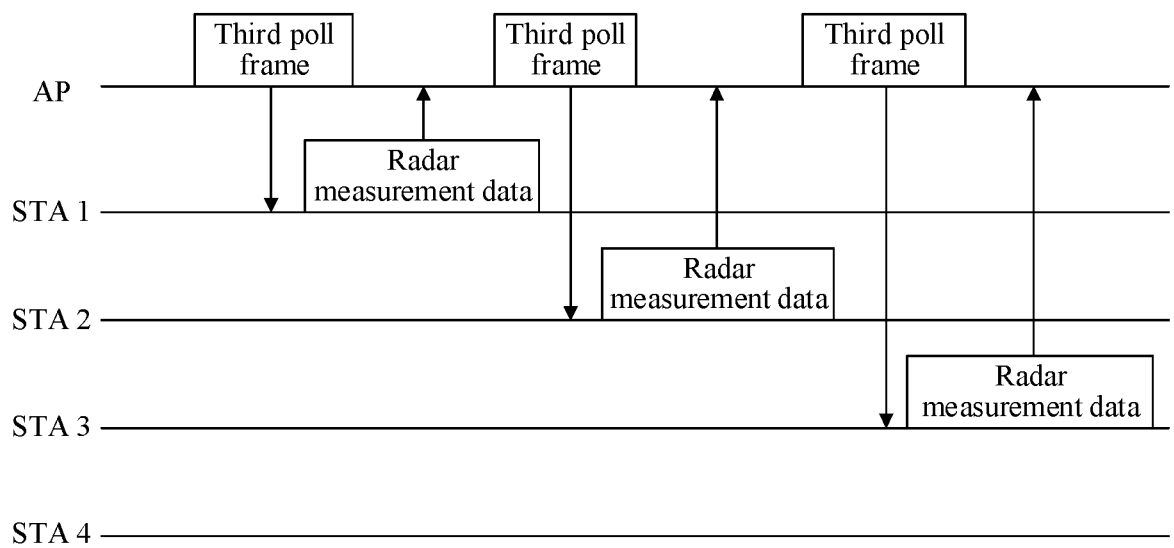
FIG. 17 is another schematic diagram depicting that an AP coordinates a plurality of STAs to feed back radar measurement data according to an embodiment of this application.

With reference to FIG. 17, for example, the AP sends the third poll frame to the STA 1, and the STA 1 feeds back radar measurement data to the AP. The AP sends the third poll frame to the STA 2, and the STA 2 feeds back radar measurement data to the AP. The AP sends the third poll frame to the STA 3, and the STA 3 feeds back radar measurement data to the AP.

The following describes a frame structure of the third poll frame, so that a person skilled in the art understands the third poll frame.

Figure 31:
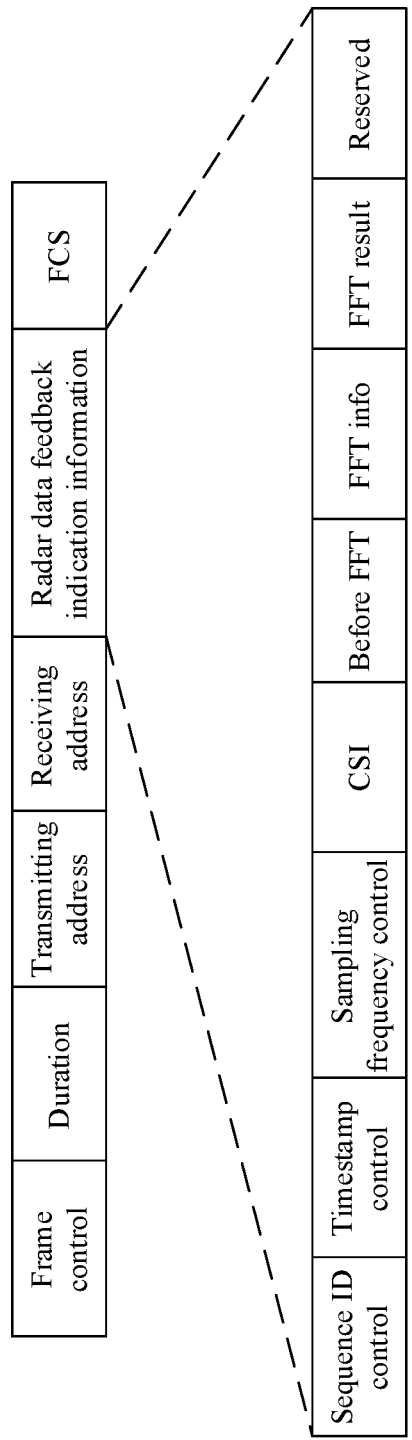
FIG. 31 is a schematic diagram of a structure of a third poll frame according to an embodiment of this application.

As shown in FIG. 31, the third poll frame may include at least one of the following bit fields: a frame control field, a duration field, a receiving address (RA) field, a transmitting address (TA) field, a radar data feedback indication information field, and an FCS field.

The radar data feedback indication information is used to indicate radar measurement data that a STA needs to feed back.

The radar data feedback indication information includes at least one of the following bit fields: a sequence number control field, a timestamp control field, a sampling frequency control field, a CSI field, a Before FFT field, an FFT info field, an FFT result field, and a reserved field.

The sequence ID control field is used to indicate whether the STA feeds back a sequence ID. The timestamp control field is used to indicate whether the STA feeds back a timestamp. The sampling frequency control field is used to indicate whether the STA feeds back a sampling frequency domain. The CSI field is used to indicate whether the STA feeds back CSI. The Before FFT field is used to indicate whether the STA feeds back sampled data of a time domain signal. The FFT info field is used to indicate whether the STA feeds back an FFT spectrum. The FFT result field is used to indicate whether the STA feeds back radar measurement data.

According to the technical solution shown in FIG. 16, the AP separately sends the third poll frame to different STAs, so that a STA that receives the third poll frame feeds back radar measurement data. In this way, a plurality of STAs can sequentially report radar measurement data to the AP.

For example, the radar measurement data may include at least one of the following parameters.

(1) A sequence ID, used to avoid feedback sequence disorder.
(2) A timestamp, used to avoid feedback time disorder.
(3) A sampling frequency, used to indicate a sampling frequency of the FFT.
(4) CSI.
(5) Sampled data of a time domain signal, including each sample and a corresponding sampling value of a time domain signal on which fast Fourier transformation (FFT) is not performed.
(6) An FFT spectrum. It should be noted that the FFT spectrum is obtained through performing L-point FFT transformation on a sampled digital signal. It should be noted that, when feeding back the FFT spectrum to the AP, the STA may feed back an FFT result corresponding to each transformation point in the FFT spectrum to the AP.
(7) A radar measurement result, including: a range, a velocity, and an angle. The range is a range between a measured object and a radar. The velocity is a velocity of the measured object. The angle is an angle between the measured object and the radar.

The range may be determined based on a value of an abscissa corresponding to the peak in a range-FFT spectrum. The velocity may be determined based on a value of an abscissa corresponding to the peak in a doppler-FFT spectrum. The angle may be determined based on a value of an abscissa corresponding to the peak in an angle-FFT spectrum.

It should be noted that the velocity in the radar measurement data may also be a phase.

In an embodiment, in a specific implementation, the radar measurement result may directly include: a value of an abscissa corresponding to the peak in a range-FFT spectrum, a value of an abscissa corresponding to the peak in a doppler-FFT spectrum, and a value of an abscissa corresponding to the peak in an angle-FFT spectrum.

It should be noted that, the time domain signal refers to a time domain signal obtained through frequency mixing on a radar transmitting signal and a radar receiving signal, in other words, an intermediate frequency signal.

In this embodiment of this application, the radar measurement data may be carried in a sixth frame. In other words, a STA may send a sixth frame to the AP, where the sixth frame includes the radar measurement data. The sixth frame may have another name, for example, a WiFi sensing data frame (WiFi sensing data frame). This is not limited in this embodiment of this application.

For example, the following describes a frame structure of the sixth frame.

Figure 18:
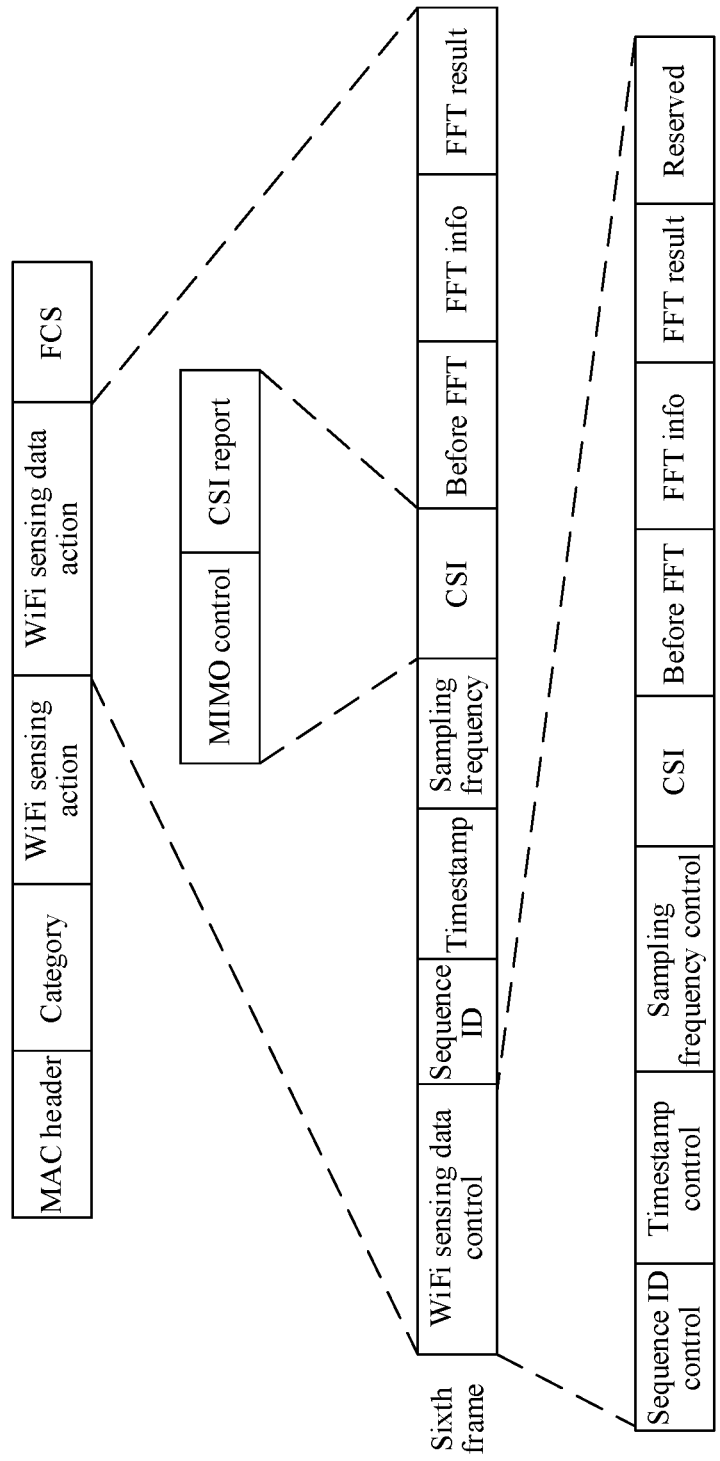
FIG. 18 is a schematic diagram of a frame structure of a sixth frame according to an embodiment of this application.

As shown in FIG. 18, the sixth frame includes at least one of the following bit fields: a MAC frame header field, a category field, a WiFi sensing action field, a WiFi sensing data action field, and an FCS field.

A value of the category field in the sixth frame is a preset value, and is used to indicate that an operation type of the sixth frame is WiFi sensing. The preset value may be any reserved value of a category field in an action no ack frame in the conventional technology, for example, 31. For example, Table 3 shows a correspondence between a value of a category field and a defined operation type.

TABLE 3

| Value of a category field | Description |
| --- | --- |
| 0- . . . | . . . |
| 31 | WiFi sensing |
| . . . -255 | . . . |

As shown in FIG. 18, the WiFi sensing data action field includes at least one of the following bit fields: a WiFi sensing data control field, a sequence ID field, a timestamp field, a sampling frequency field, a CSI field, a Before FFT field, an FFT info field, and an FFT result field.

The sequence ID field is used to carry a sequence ID in radar measurement data. The timestamp field is used to carry a timestamp in radar measurement data. The sampling frequency field is used to carry a sampling frequency in radar measurement data. The CSI field is used to carry CSI in radar measurement data. The Before FFT field is used to carry sampled data of a time domain signal in radar measurement data. The FFT info field is used to carry a range-FFT spectrum, a doppler-FFT spectrum, and/or an angle-FFT spectrum. The FFT result field is used to carry a radar measurement result in radar measurement data.

The following describes bit fields in the WiFi sensing data action field.

(1) WiFi Sensing Data Control Field

As shown in FIG. 18, the WiFi sensing data control field includes the following bit fields: a sequence number control field, a timestamp control field, a sampling frequency control field, a CSI field, a Before FFT field, an FFT info field, and an FFT result field.

In an embodiment, to distinguish related bit fields in the WiFi sensing data action field, in the WiFi sensing data control field, the sequence ID control field may be denoted as a first indication field, the timestamp control may be denoted as a second indication field, the sampling frequency control may be denoted as a third indication field, the CSI field may be denoted as a fourth indication field, the Before FFT field may be denoted as a fifth indication field, the FFT info field may be denoted as a sixth indication field, and the FFT result field may be denoted as a seventh indication field.

The first indication field is used to indicate whether the sixth frame includes a sequence ID. In an embodiment, the first indication field may be implemented by using one bit. That a value of the first indication field is "0" indicates that the sixth frame does not include a sequence ID. That a value of the first indication field is "1" indicates that the sixth frame includes a sequence ID.

The second indication field is used to indicate whether the sixth frame includes a timestamp. In an embodiment, the second indication field may be implemented by using one bit. That a value of the second indication field is "0" indicates that the sixth frame does not include a timestamp. That a value of the second indication field is "1" indicates that the sixth frame includes a timestamp.

The third indication field is used to indicate whether the sixth frame includes a sampling frequency. In an embodiment, the third indication field may be implemented by using one bit. That a value of the third indication field is "0" indicates that the sixth frame does not include a sampling frequency. That a value of the third indication field is "1" indicates that the sixth frame includes a sampling frequency.

The fourth indication field is used to indicate whether the sixth frame includes CSI. In an embodiment, the fourth indication field may be implemented by using one bit. That a value of the fourth indication field is "0" indicates that the sixth frame does not include CSI. That a value of the fourth indication field is "1" indicates that the sixth frame includes CSI.

The fifth indication field is used to indicate whether the sixth frame includes sampled data of a time domain signal. In an embodiment, the fifth indication field may be implemented by using one bit. That a value of the fifth indication field is "0" indicates that the sixth frame does not include sampled data of a time domain signal. That a value of the fifth indication field is "1" indicates that the sixth frame includes sampled data of a time domain signal.

The sixth indication field is used to indicate whether the sixth frame includes an FFT spectrum. In an embodiment, the sixth indication field may be implemented by using one bit. That a value of the sixth indication field is "0" indicates that the sixth frame does not include an FFT spectrum. That a value of the sixth indication field is "1" indicates that the sixth frame includes an FFT spectrum.

The seventh indication field is used to indicate whether the sixth frame includes a radar measurement result. In an embodiment, the seventh indication field may be implemented by using one bit. That a value of the seventh indication field is "0" indicates that the sixth frame does not include a radar measurement result. That a value of the seventh indication field is "1" indicates that the sixth frame includes a radar measurement result.

(2) CSI Field

As shown in FIG. 18, the CSI field includes at least one of the following parameters: MIMO control and a CSI report.

(3) FFT Result Field

As shown in FIG. 19, the FFT result field includes at least one of the following parameters: an element ID, an element length, an element ID extension, feedback control, a number of range parameter feedbacks (for example, Nr), Nr range parameters, a number of velocity parameter feedbacks (for example, Nv), Nv velocity parameters, a number of angle parameter feedbacks (for example, Na), and Na angle parameters.

The number of range parameter feedbacks is used to indicate a number of range parameters that need to be fed back. The range parameter is used to indicate a range between a measured object and a radar determined in one radar measurement process.

The number of velocity parameter feedbacks is used to indicate a number of velocity parameters that need to be fed back. The velocity parameter is used to indicate a velocity of a measured object determined in one radar measurement process.

The number of angle parameter feedbacks is used to indicate a number of angle parameters that need to be fed back. The angle parameter is used to indicate an angle between a measured object and a radar determined in one radar measurement process.

As shown in FIG. 20, the feedback control field includes at least one of the following bit fields: a range feedback control field, a velocity feedback control field, an angle feedback control field, and a reserved field.

The range feedback control field is used to indicate whether a radar measurement result carried in the FFT result field includes a range. In an embodiment, the range feedback control field may be implemented by using one bit. That a value of the range feedback control field is 0 indicates that the radar measurement result carried in the FFT result field does not include a range. That a value of the range feedback control field is 1 indicates that the radar measurement result carried in the FFT result field includes a range.

The velocity feedback control field is used to indicate whether a radar measurement result carried in the FFT result field includes a velocity. In an embodiment, the velocity feedback control field may be implemented by using one bit. That a value of the velocity feedback control field is 0 indicates that the radar measurement result carried in the FFT result field does not include a velocity. That a value of the velocity feedback control field is 1 indicates that the radar measurement result carried in the FFT result field includes a velocity.

The angle feedback control field is used to indicate whether a radar measurement result carried in the FFT result field includes an angle. In an embodiment, the angle feedback control field may be implemented by using one bit. That a value of the angle feedback control field is 0 indicates that the radar measurement result carried in the FFT result field does not include an angle. That a value of the angle feedback control field is 1 indicates that the radar measurement result carried in the FFT result field includes an angle.

(4) Before FFT Field

As shown in FIG. 21, the Before FFT field includes at least one of the following parameters: an element ID, an element length, an element ID extension, a number of samples (for example, a number of samples is K), and a value of each sample in the K samples.

(5) FFT Info Field

As shown in FIG. 22, the FFT info field includes at least one of the following parameters: an element ID, an element length, an element ID extension, a number of transformation points for FFT (for example, a number of transformation points for FFT is P), and an FFT result corresponding to each transformation point in the P transformation points.

The foregoing describes the sixth frame, and details are not described in the following again.

As shown in FIG. 23, an embodiment of this application provides a radar capability indication method, to enable an AP to learn of a radar capability of a STA, so that subsequent radar measurement can be properly performed. The method includes the following operations.

S801. A STA generates second radar capability indication information.

The second radar capability indication information is used to indicate whether the STA supports radar measurement.

Implementation 1: The second radar capability indication information may be used to directly indicate whether the STA supports radar measurement. For example, the second radar capability indication information may be implemented by using one bit. That a value of the second radar capability indication information is "0" indicates that the STA does not support radar measurement. That a value of the second radar capability indication information is "1" indicates that the STA supports radar measurement.

Implementation 2: The second radar capability indication information may indicate a radar type supported by the STA to indirectly indicate whether the STA supports radar measurement. Radar types include a monostatic radar, a bistatic radar, and a multistatic radar. It may be understood that, when the second radar capability indication information indicates that the STA does not support any radar type, the second radar capability indication information indirectly indicates that the STA does not support radar measurement. Alternatively, when the second radar capability indication information indicates that the STA supports one or more of a monostatic radar, a bistatic radar, and a multistatic radar, the second radar capability indication information indirectly indicates that the STA supports radar measurement.

For example, the second radar capability indication information may be implemented by using two bits. That a value of the second radar capability indication information is "00" indicates that the STA does not support any radar type. That a value of the second radar capability indication information is "01" indicates that the STA supports a monostatic radar. That a value of the second radar capability indication information is "10" indicates that the STA supports a bistatic radar. That a value of the second radar capability indication information is "11" indicates that the STA supports a multistatic radar.

For example, the second radar capability indication information may be implemented by using two bits. That a value of the second radar capability indication information is "00" indicates that the STA does not support any radar type. That a value of the second radar capability indication information is "01" indicates that the STA supports a monostatic radar. That a value of the second radar capability indication information is "10" indicates that the STA supports a bistatic radar and a multistatic radar. That a value of the second radar capability indication information is "11" indicates that the STA supports a monostatic radar, a bistatic radar, and a multistatic radar.

Figure 24:
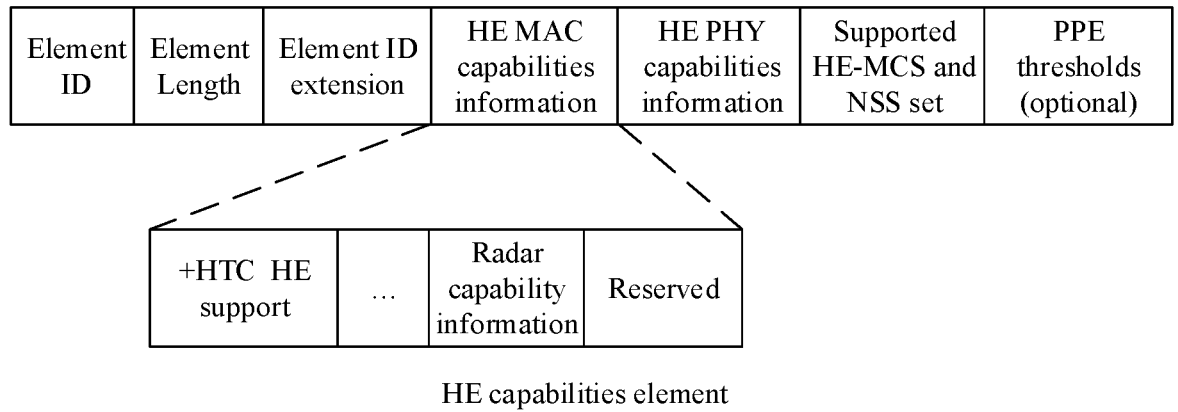
FIG. 24 is a schematic diagram of an HE Capabilities element according to an embodiment of this application.

In an embodiment, as shown in FIG. 24, the second radar capability indication information may be implemented by using a reserved bit in HE MAC capabilities information in a high efficiency (HE) capabilities element. For example, reserved bits in HE MAC capabilities information in the conventional technology include four bits. Two bits of the four bits may be used as the second radar capability indication information.

Figure 25:
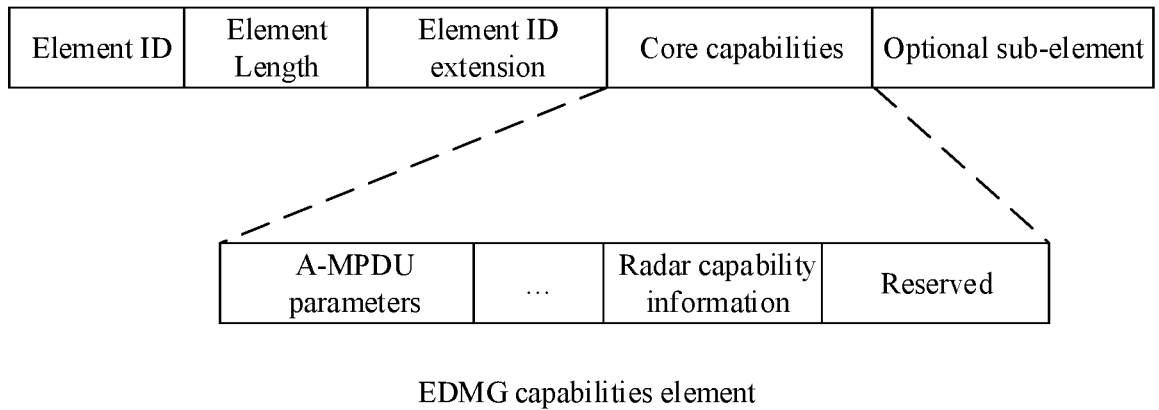
FIG. 25 is a schematic diagram of an EDMG Capabilities element according to an embodiment of this application.

In an embodiment, as shown in FIG. 25, the second radar capability indication information may be implemented by using a reserved bit in core capabilities in an enhanced directional multi-gigabit (EDMG) header, in other words, an EDMG capabilities element. For example, reserved bits in core capabilities in the conventional technology include five bits. Two bits of the five bits may be used as the second radar capability indication information.

In an embodiment, for the implementation 2, in a case in which the second radar capability indication information is used to indicate that the radar type supported by the STA is a bistatic radar/multistatic radar, the second radar capability indication information may be further used to indicate whether the STA is supported to be a transmitter of a bistatic radar/multistatic radar, and/or whether the STA is supported to be a receiver of a bistatic radar/multistatic radar.

S802. The STA sends the second radar capability indication information to an AP, so that the AP receives the second radar capability indication information sent by the STA.

According to the technical solution shown in FIG. 23, the STA sends the second radar capability indication information to the AP, so that the AP learns of a radar capability of the STA, and is prevented from scheduling a STA that does not support radar measurement to perform radar measurement, and therefore proper execution of radar measurement is not affected.

Figure 26:
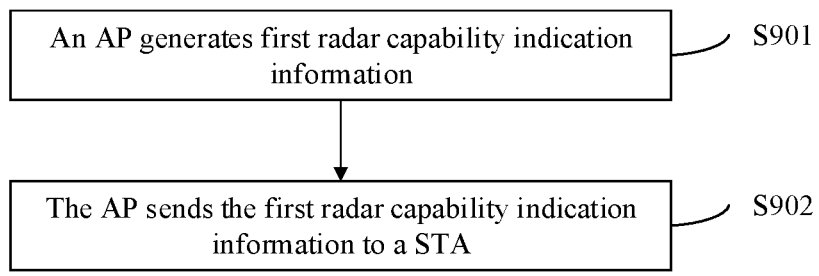
FIG. 26 is a flowchart of an indication method according to an embodiment of this application.

FIG. 26 shows an indication method provided in an embodiment of this application. The method is used to enable a STA to learn whether an AP supports joint processing of a plurality of pieces of radar measurement data, so that the STA can actively request an AP to coordinate a plurality of STAs to jointly perform radar measurement. The method includes the following operations.

S901. An AP generates first radar capability indication information.

The first radar capability indication information is used to indicate whether the AP supports joint processing of a plurality of pieces of radar measurement data.

It may be understood that, when the AP supports joint processing of a plurality of pieces of radar measurement data, the AP can coordinate a plurality of STAs to jointly perform a radar measurement procedure, to improve measurement accuracy.

S902. The AP sends the first radar capability indication information to a STA, so that the STA receives the first radar capability indication information sent by the AP.

The first radar capability indication information may be carried in a beacon (beacon) frame.

In an implementation, the AP sends the first radar capability indication information to a STA in a coverage area in a broadcast manner.

According to the technical solution shown in FIG. 26, the AP uses the first radar capability indication information to enable the STA to learn whether the AP supports joint processing of a plurality of radar measurement data, and learn whether the AP can coordinate a plurality of STAs to jointly perform radar measurement. In this way, if the AP can coordinate a plurality of STAs to jointly perform radar measurement, the STA may actively request the AP to coordinate a plurality of STAs to jointly perform radar measurement in a subsequent radar measurement procedure, to improve accuracy of radar measurement.

The foregoing mainly describes the solutions provided in the embodiments of this application from a perspective of interaction between network elements. It may be understood that, to implement the foregoing functions, each network element such as the AP or the STA includes a corresponding hardware structure and/or software module for implementing each function. A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the apparatus may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that module division in the embodiments of this application is an example, and is merely a logical function division. During actual implementation, another division manner may be used. The following provides descriptions by using an example in which each function module is obtained through division based on a corresponding function.

Figure 27:
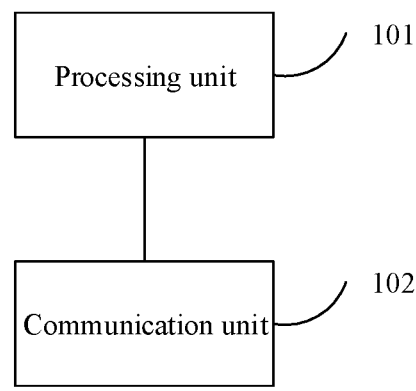
FIG. 27 is a schematic diagram of a structure of a communication apparatus according to an embodiment of this application.

FIG. 27 is a schematic diagram of a structure of a communication apparatus according to an embodiment of this application. As shown in FIG. 27, the communication apparatus may include a processing unit 101 and a communication unit 102.

(1) The following briefly describes operations performed by units in the communication apparatus when the communication apparatus serves as an AP.

A communication unit 102 is configured to generate a first frame, where the first frame includes radar measurement information. A processing unit 101 is configured to send a first frame to M STAs, where M is a positive integer.

In an embodiment, the first frame is used to indicate the M STAs to be ready for radar measurement. Alternatively, the first frame is used to instruct each STA in the M STAs to perform radar measurement. Alternatively, the first frame is used to indicate a STA that obtains a channel through contention in the M STAs to perform radar measurement.

In an embodiment, if the first frame is used to instruct the M STAs to be ready for radar measurement, the communication unit is further configured to send a first poll frame to a target STA, where the target STA is any STA in the M STAs, and the first poll frame is used to trigger the target STA to perform radar measurement.

In an embodiment, the radar measurement information includes at least one of the following parameters: a radar measurement start time point, a measurement periodicity, radar measurement duration, a measurement frequency band, radar measurement resource allocation information, a data feedback information indication, and a radar data feedback type.

In an embodiment, the communication unit 102 is further configured to: send a second frame to a STA, where the second frame is used to reserve a transmission opportunity for radar measurement; and receive a third frame sent by the STA, where the third frame is used to respond to the second frame.

In an embodiment, the communication unit 102 is further configured to: send a fourth frame to N STAs, where the fourth frame is used to request each STA in the N STAs to feed back radar measurement data, the N STAs belong to the M STAs, and N is a positive integer; and receive a sixth frame separately sent by one or more STAs in the N STAs, where the sixth frame includes the radar measurement data.

In an embodiment, the communication unit 102 is further configured to: send a fifth frame to the N STAs, where the fifth frame is used to instruct each STA in the N STAs to be ready for feeding back radar measurement data; send a second poll frame to a target STA, where the second poll frame is used to trigger the target STA to feed back radar measurement data; and receive a sixth frame sent by the target STA, where the sixth frame includes the radar measurement data.

In an embodiment, the communication unit 102 is further configured to: send a third poll frame to a target STA, where the third poll frame is used to trigger the target STA to feed back radar measurement data; and receive a sixth frame sent by the target STA, where the sixth frame includes the radar measurement data.

In an embodiment, the radar measurement data includes at least one of the following parameters: a sequence ID, a timestamp, a sampling frequency, sampled data of a time domain signal, a fast Fourier transformation spectrum, a radar measurement result, and channel state information, where the radar measurement result includes at least one of the following parameters: a range, a velocity, and an angle.

In an embodiment, the communication unit 102 is further configured to send first radar capability indication information to a STA, where the first radar capability indication information is used to indicate whether the AP supports joint processing of a plurality of pieces of radar measurement data.

In an embodiment, the communication unit 102 is further configured to receive second radar capability indication information sent by a STA, where the second radar capability indication information is used to indicate whether the STA supports radar measurement.

In an embodiment, that the second radar capability indication information is used to indicate whether the STA supports radar measurement includes: The second radar capability indication information is used to indicate a radar type supported by the STA, where the radar type includes: a monostatic radar, a bistatic radar, and a multistatic radar.

(2) The following briefly describes operations performed by units in the communication apparatus when the communication apparatus serves as a STA.

A communication unit 102 is configured to receive a first frame sent by an AP, where the first frame includes radar measurement information. A processing unit 101 is configured to determine the radar measurement information based on the first frame.

In an embodiment, the processing unit 101 is further configured to perform radar measurement based on the radar measurement information after receiving the first frame.

In an embodiment, the communication unit 102 is further configured to receive a first poll frame sent by the AP, where the first poll frame is used to trigger the STA to perform radar measurement. The processing unit 101 is further configured to perform radar measurement based on the radar measurement information.

In an embodiment, the processing unit 101 is further configured to perform radar measurement based on the radar measurement information after obtaining a channel through contention.

In an embodiment, the radar measurement information includes at least one of the following parameters: a radar measurement start time point, a measurement periodicity, radar measurement duration, a measurement frequency band, radar measurement resource allocation information, a data feedback information indication, and a radar data feedback type.

In an embodiment, the communication unit 102 is further configured to: receive a second frame sent by the AP, where the second frame is used to reserve a transmission opportunity for radar measurement; and send a third frame to the AP, where the third frame is used to respond to the second frame.

In an embodiment, the communication unit 102 is further configured to: receive a fourth frame sent by the AP, where the fourth frame is used to request at least one STA to feed back radar measurement data; and send a sixth frame to the AP, where the sixth frame includes the radar measurement data.

In an embodiment, the communication unit 102 is further configured to: receive a fifth frame sent by the AP, where the fifth frame is used to instruct at least one STA to be ready for feeding back radar measurement data; receive a second poll frame sent by the AP, where the second poll frame is used to trigger the STA to feed back radar measurement data; and send a sixth frame to the AP, where the sixth frame includes the radar measurement data.

In an embodiment, the communication unit 102 is further configured to: receive a third poll frame sent by the AP, where the third poll frame is used to trigger the STA to feed back radar measurement data; and send a sixth frame to the AP, where the sixth frame includes the radar measurement data.

In an embodiment, the radar measurement data includes at least one of the following parameters: a sequence ID, a timestamp, a sampling frequency, sampled data of a time domain signal, a fast Fourier transformation spectrum, a radar measurement result, and channel state information. The radar measurement result includes at least one of the following parameters: a range, a velocity, and an angle.

In an embodiment, the communication unit 102 is further configured to receive first radar capability indication information sent by the AP, where the first radar capability indication information is used to indicate whether the AP supports joint processing of a plurality of pieces of radar measurement data.

In an embodiment, the communication unit 102 is further configured to send second radar capability indication information to the AP, where the second radar capability indication information is used to indicate whether the STA supports radar measurement.

In an embodiment, that the second radar capability indication information is used to indicate whether the STA supports radar measurement includes: The second radar capability indication information is used to indicate a radar type supported by the STA, where the radar type includes: a monostatic radar, a bistatic radar, and a multistatic radar.

The communication apparatus provided in this embodiment of this application may be implemented in a plurality of product forms. For example, the communication apparatus may be configured as a general-purpose processing system. For another example, the communication apparatus may be implemented by using a general bus architecture. For another example, the communication apparatus may be implemented by using an application specific integrated circuit (ASIC). The following provides several possible product forms of the communication apparatus described in the embodiments of this application. It should be understood that, the following product forms are merely examples, and the possible product forms of the communication apparatus described in the embodiments of this application are not limited.

Figure 28:
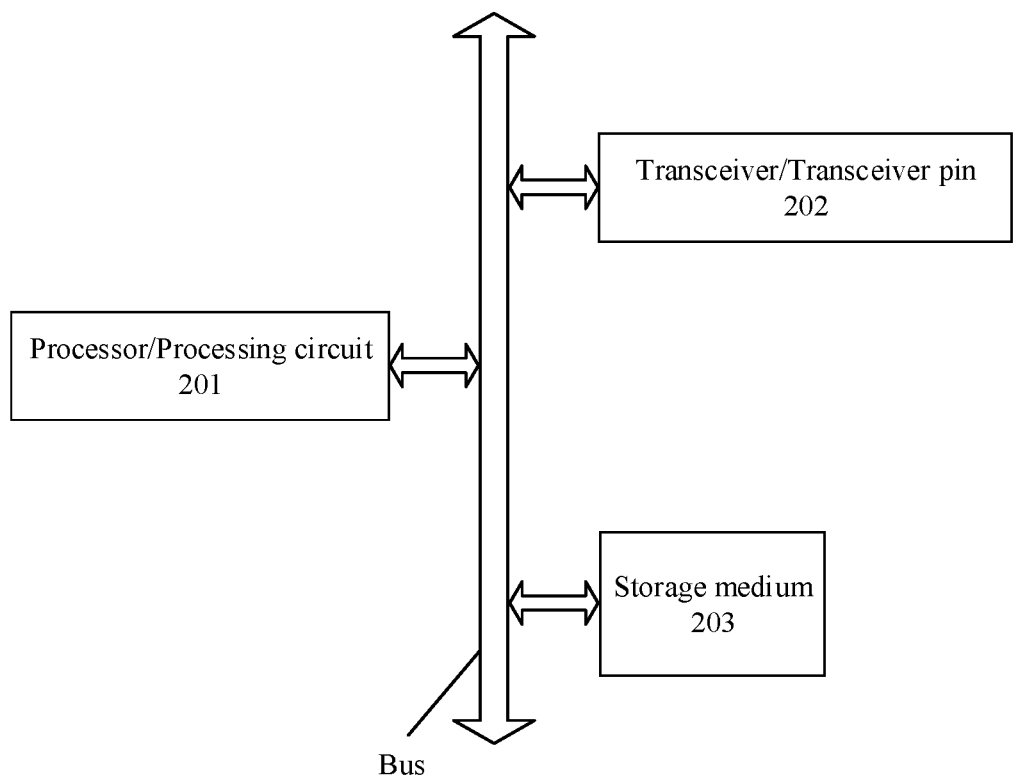
FIG. 28 is a schematic diagram of a structure of a communication apparatus according to an embodiment of this application.

FIG. 28 is a result diagram of a possible product form of a communication apparatus according to an embodiment of this application.

In a possible product form, the communication apparatus in this embodiment of this application may be a communication device, and the communication device includes a processor 201 and a transceiver 202. In an embodiment, the communication device further includes a storage medium 203. The processor 201 is configured to perform the methods shown in FIG. 3, FIG. 5, FIG. 7, FIG. 10, FIG. 11, FIG. 14, FIG. 16, FIG. 23, and FIG. 26. The transceiver 202 is controlled by the processor 201, and is configured to perform the methods shown in FIG. 3, FIG. 5, FIG. 7, FIG. 10, FIG. 11, FIG. 14, FIG. 16, FIG. 23, and FIG. 26.

In another possible product form, the communication apparatus described in this embodiment of this application may alternatively be implemented by a general-purpose processor or a special-purpose processor that is commonly referred to as a chip. The general-purpose processor includes a processing circuit 201 and a transceiver pin 202. In an embodiment, the general-purpose processor may further include a storage medium 203. The processing circuit 201 is configured to perform the methods shown in FIG. 3, FIG. 5, FIG. 7, FIG. 10, FIG. 11, FIG. 14, FIG. 16, FIG. 23, and FIG. 26. The transceiver pin 202 is controlled by the processing circuit 201, and is configured to perform the methods shown in FIG. 3, FIG. 5, FIG. 7, FIG. 10, FIG. 11, FIG. 14, FIG. 16, FIG. 23, and FIG. 26.

In another possible product form, the communication apparatus described in this embodiment of this application may alternatively be implemented by using the following circuit or component: one or more field programmable gate arrays (FPGAs), programmable logic devices (PLDs), controllers, state machines, gate logic, discrete hardware components, any other appropriate circuits, or any combination of circuits that can perform the various functions described in this application.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another operation, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:
1. A radar measurement method, wherein the method comprises:
generating, by an AP, a first frame, wherein the first frame comprises radar measurement information;

sending, by the AP, the first frame to M stations (STAs) to obtain information corresponding to an object, wherein M is a positive integer, and wherein the first frame is a trigger frame and comprises a trigger type field to instruct at least one of the M STAs to obtain the information corresponding to the object, wherein the trigger type field comprises an identifier that indicates the first frame is used for radar measurement, and wherein the trigger type field instructs at least one of:
the M STAs to get ready for a radar measurement comprising receiving a radar signal initiated by at least one of the M STAs;
each STA in the M STAs to perform a radar measurement comprising transmitting the radar signal; or
a STA that obtains a channel through contention in the M STAs to perform a radar measurement comprising transmitting the radar signal; and
when the first frame is to instruct the M STAs to be ready for the radar measurement, the method further comprises:
sending, by the AP, a first poll frame to a target STA, wherein the target STA is an STA in the M STAs, and the first poll frame is to trigger the target STA to perform radar measurement;
sending, by the AP, a fifth frame to N STAs, wherein the fifth frame is to instruct each STA in the N STAs to be ready for feeding back radar measurement data;
sending, by the AP, a second poll frame to the target STA, wherein the second poll frame is to trigger the target STA to feed back radar measurement data; and
receiving, by the AP, a sixth frame sent by the target STA, wherein the sixth frame comprises the radar measurement data.

2. The method according to claim 1, wherein the radar measurement information comprises at least one of the following parameters: a radar measurement start time point, a measurement periodicity, radar measurement duration, a measurement frequency band, radar measurement resource allocation information, a data feedback information indication, or a radar data feedback type.

3. The radar measurement method according to claim 1, wherein the method further comprises:
sending, by the AP, a second frame to a STA of the M STAs, wherein the second frame is to reserve a transmission opportunity for radar measurement; and
receiving, by the AP, a third frame sent by the STA, wherein the third frame is to respond to the second frame.

4. The radar measurement method according to claim 1, wherein the method further comprises:
sending, by the AP, a fourth frame to the N STAs, wherein the fourth frame is to request each STA in the N STAs to feed back radar measurement data, the N STAs belong to the M STAs, and N is a positive integer; and
receiving, by the AP, the sixth frame separately sent by one or more STAs in the N STAs, wherein the sixth frame comprises the radar measurement data.

5. The radar measurement method according to claim 1, wherein the method further comprises:
sending, by the AP, a third poll frame to the target STA, wherein the third poll frame is to trigger the target STA to feed back radar measurement data; and
receiving, by the AP, the sixth frame sent by the target STA, wherein the sixth frame comprises the radar measurement data.

6. The radar measurement method according to claim 4, wherein the radar measurement data comprises at least one of the following parameters: a sequence ID, a timestamp, a sampling frequency, sampled data of a time domain signal, a fast Fourier transformation spectrum, a radar measurement result, or channel state information, wherein
the radar measurement result comprises at least one of the following parameters: a range, a velocity, or an angle.

7. The radar measurement method according to claim 4, wherein the method further comprises:
sending, by the AP, first radar capability indication information to a STA of the M STAs, wherein the first radar capability indication information is to indicate whether the AP supports joint processing of a plurality of pieces of radar measurement data.

8. A radar measurement method, wherein the method comprises:
receiving, by a station (STA), a first frame sent by an access point (AP), wherein the first frame comprises radar measurement information corresponding to an object;
determining, by the STA, the radar measurement information based on the first frame, wherein the first frame is a trigger frame and comprises a trigger type field, the trigger type field comprising an identifier that indicates the first frame is used for radar measurement, and wherein the trigger type field instructs the STA to at least one of:
the STA to get ready for a radar measurement comprising receiving a radar signal initiated by at least one STA;
the STA to perform a radar measurement comprising transmitting the radar signal; or
the STA that obtains a channel through contention to perform a radar measurement comprising transmitting the radar signal;
when the first frame is to instruct the M STAs to be ready for the radar measurement, the method further comprises:
receiving, by the STA, a first poll frame sent by the AP, wherein the first poll frame is to trigger the STA to perform the radar measurement; and
performing, by the STA, the radar measurement comprising transmitting the radar signal based on the radar measurement information;
receiving, by the STA, a fifth frame sent by the AP, wherein the fifth frame is to instruct at least one STA to be ready for feeding back radar measurement data;
receiving, by the STA, a second poll frame sent by the AP, wherein the second poll frame is to trigger the STA to feed back radar measurement data; and
sending, by the STA, a sixth frame to the AP, wherein the sixth frame comprises the radar measurement data.

9. The radar measurement method according to claim 8, wherein the method further comprises:
performing, by the STA, the radar measurement comprising transmitting the radar signal based on the radar measurement information after receiving the first frame.

10. The radar measurement method according to claim 8, wherein the method further comprises:
performing, by the STA, the radar measurement comprising transmitting the radar signal based on the radar measurement information after obtaining the channel through contention.

11. The radar measurement method according to claim 8, wherein the radar measurement information comprises at least one of the following parameters: a radar measurement start time point, a measurement periodicity, radar measurement duration, a measurement frequency band, radar measurement resource allocation information, a data feedback information indication, or a radar data feedback type.

12. The radar measurement method according to claim 8, wherein the method further comprises:
  receiving, by the STA, a second frame sent by the AP, wherein the second frame is to reserve a transmission opportunity for radar measurement; and
  sending, by the STA, a third frame to the AP, wherein the third frame is to respond to the second frame.

13. The radar measurement method according to claim 8, wherein the method further comprises:
  receiving, by the STA, a fourth frame sent by the AP, wherein the fourth frame is to request at least one STA to feed back radar measurement data; and
  sending, by the STA, the sixth frame to the AP, wherein the sixth frame comprises the radar measurement data.

14. The radar measurement method according to claim 8, wherein the method further comprises:
  receiving, by the STA, a third poll frame sent by the AP, wherein the third poll frame is to trigger the STA to feed back radar measurement data; and
  sending, by the STA, the sixth frame to the AP, wherein the sixth frame comprises the radar measurement data.

15. The radar measurement method according to claim 13, wherein the radar measurement data comprises at least one of the following parameters: a sequence ID, a timestamp, a sampling frequency, sampled data of a time domain signal, a fast Fourier transformation spectrum, a radar measurement result, or channel state information, wherein
  the radar measurement result comprises at least one of the following parameters: a range, a velocity, or an angle.

* * * * *